(12) United States Patent
Bar et al.

(10) Patent No.: US 7,996,284 B2
(45) Date of Patent: Aug. 9, 2011

(54) SPARE PLUG MANAGEMENT SYSTEM

(75) Inventors: Hena M. Bar, Atlanta, GA (US); Ronald D. Worthen, Denham Springs, LA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1178 days.

(21) Appl. No.: 11/485,500

(22) Filed: Jul. 11, 2006

(65) Prior Publication Data

US 2007/0043634 A1 Feb. 22, 2007

Related U.S. Application Data

(60) Provisional application No. 60/698,576, filed on Jul. 11, 2005, provisional application No. 60/699,097, filed on Jul. 14, 2005, provisional application No. 60/742,634, filed on Dec. 5, 2005.

(51) Int. Cl.
G06Q 10/00 (2006.01)
G05B 19/418 (2006.01)
G06F 17/50 (2006.01)

(52) U.S. Cl. .................................. 705/28; 705/8; 705/7

(58) Field of Classification Search .................. None
See application file for complete search history.

(56) References Cited

U.S. PATENT DOCUMENTS

| | | | |
|---|---|---|---|
| 5,946,662 A | 8/1999 | Ettl et al. |
| 5,973,609 A | 10/1999 | Schoch |
| 6,006,196 A | 12/1999 | Feigin et al. |
| 6,078,900 A | 6/2000 | Ettl et al. |
| 6,151,582 A | 11/2000 | Huang et al. |
| 6,845,909 B2 | 1/2005 | Bong et al. |
| 6,866,195 B2 | 3/2005 | Knowles et al. |
| 7,055,741 B2 | 6/2006 | Bong et al. |
| 7,133,804 B2 | 11/2006 | Tonack et al. |
| 7,210,624 B1 | 5/2007 | Birjandi et al. |
| 7,249,059 B2 | 7/2007 | Dean et al. |
| 7,263,501 B2 | 8/2007 | Tirinato et al. |
| 7,266,518 B2 | 9/2007 | Klim et al. |
| 7,426,484 B2 | 9/2008 | Joyce et al. |
| 7,552,071 B2 | 6/2009 | Tirinato et al. |
| 7,562,812 B2 | 7/2009 | Birjandi et al. |
| 7,580,825 B2 | 8/2009 | Birjandi et al. |
| 7,685,015 B2 | 3/2010 | Najmi et al. |

(Continued)

OTHER PUBLICATIONS

James Aaron Cooke, Getting the right fit (selecting public warehouses) Feb. 1995, Traffic Management , v34, n2, p. 78S(3).*

(Continued)

Primary Examiner — F. Ryan Zeender
Assistant Examiner — Denisse Ortiz Roman
(74) Attorney, Agent, or Firm — Hanley, Flight & Zimmerman, LLC.

(57) ABSTRACT

Embodiments of the present disclosure provide systems and methods for implementing a field supply chain logistics system for managing spare parts inventory. In one embodiment, the method comprises: identifying locations for field service locations (FSLs) field warehouses for the spare parts, based on time or distance windows to deliver the parts to the field locations each FSL serves; collecting and validating data to compute optimal field inventory levels and minimum inventory levels for non-field warehouse, the non-field warehouse including central stock; physically setting up FSLs so that the FSLs functions as field warehouses and receive plug requests; generating optimal inventory profiles; opening FSLs for service; conducting plug inventory to retrieve plug excess and deploy new levels; and conducting after implementation review to verify that processes are being followed as expected and document lessons learned.

20 Claims, 15 Drawing Sheets

U.S. PATENT DOCUMENTS

| | | | |
|---|---|---|---|
| 2001/0034673 A1* | 10/2001 | Yang et al. | 705/28 |
| 2002/0055886 A1 | 5/2002 | Hinckley | |
| 2002/0133387 A1* | 9/2002 | Wilson et al. | 705/8 |
| 2002/0188486 A1 | 12/2002 | Gil et al. | |
| 2002/0198794 A1 | 12/2002 | Williams et al. | |
| 2003/0061126 A1 | 3/2003 | Erke et al. | |
| 2003/0163489 A1 | 8/2003 | Tonack et al. | |
| 2003/0212614 A1 | 11/2003 | Chu et al. | |
| 2004/0030724 A1 | 2/2004 | Rosenquist et al. | |
| 2004/0068431 A1 | 4/2004 | Smith et al. | |
| 2004/0084526 A1 | 5/2004 | Knowles et al. | |
| 2004/0084527 A1 | 5/2004 | Bong et al. | |
| 2004/0181528 A1 | 9/2004 | Tirinato et al. | |
| 2004/0267640 A1 | 12/2004 | Bong et al. | |
| 2005/0004831 A1 | 1/2005 | Najmi et al. | |
| 2005/0075949 A1 | 4/2005 | Uhrig et al. | |
| 2005/0216366 A1 | 9/2005 | Vincent et al. | |
| 2006/0010067 A1 | 1/2006 | Notani et al. | |
| 2006/0031084 A1 | 2/2006 | Schierholt et al. | |
| 2006/0047559 A1 | 3/2006 | Jacoby et al. | |
| 2006/0100945 A1 | 5/2006 | Macy et al. | |
| 2006/0235732 A1* | 10/2006 | Miller et al. | 705/7 |
| 2007/0016496 A1 | 1/2007 | Bar | |
| 2007/0043536 A1 | 2/2007 | Tonack et al. | |
| 2007/0152049 A1 | 7/2007 | Bar | |
| 2007/0233583 A1 | 10/2007 | Tirinato et al. | |
| 2008/0040245 A1 | 2/2008 | Wadawadigi et al. | |
| 2008/0147490 A1 | 6/2008 | Najmi et al. | |
| 2009/0204513 A1 | 8/2009 | Tirinato et al. | |

OTHER PUBLICATIONS

United States Patent and Trademark Office, "Non-Final Office Action," issued in connection with U.S. Appl. No. 11/688,386, on May 13, 2009 (13 pages).

United States Patent and Trademark Office, "Non-Final Office Action," issued in connection with U.S. Appl. No. 11/485,499, on May 29, 2009 (14 pages).

Bar; U.S. Appl. No. 11/485,499, filed Jul. 11, 2006.

Bar; U.S. Appl. No. 11/688,386, filed Mar. 20, 2007.

United States Patent and Trademark Office, "Non-Final Office Action," issued in connection with U.S. Appl. No. 11/688,386, on Dec. 8, 2009 (15 pages).

United States Patent and Trademark Office, "Non-Final Office Action," issued in connection with U.S. Appl. No. 11/485,499, on Dec. 10, 2009 (19 pages).

United States Patent and Trademark Office, "Non-Final Office Action," issued in connection with U.S. Appl. No. 11/688,386, on Nov. 2, 2010 (20 pages).

United States Patent and Trademark Office, "Non-Final Office Action," issued in connection with U.S. Appl. No. 11/485,499, on Oct. 19, 2010 (26 pages).

United States Patent and Trademark Office, "Non-Final Office Action," issued in connection with U.S. Appl. No. 11/688,386, on May 24, 2010 (17 pages).

United States Patent and Trademark Office, "Non-Final Office Action," issued in connection with U.S. Appl. No. 11/485,499, on May 18, 2010 (21 pages).

* cited by examiner

PRIMARY LOCATION
(applies to ALL plugs)

| Criticality Level | |
|---|---|
| 1 (High) | FIELD |
| 2 (Medium) | FSL |
| 3 (Low) | CENTRAL STOCK |

SECONDARY LOCATION
(stocked depending on cost and usage)

| Criticality Level | |
|---|---|
| 1 (High) | FSL |
| 2 (Medium) | FIELD |
| 3 (Low) | FIELD |

FIG. 10

SPARE PLUG MANAGEMENT SYSTEM

CROSS-REFERENCE TO RELATED APPLICATION

This application claims priority to copending U.S. provisional applications entitled, "Spare Inventory Management System" having Ser. No. 60/698,576, filed Jul. 11, 2005, "Spare Inventory Management System" having Ser. No. 60/699,097, filed Jul. 14, 2005, and "Spare Inventory Management System" having Ser. No. 60/742,634, filed Dec. 5, 2005, which are entirely incorporated herein by reference.

TECHNICAL FIELD

The present disclosure is generally related to an inventory management system and method.

BACKGROUND

The telecommunication industry has developed a telecom network that includes plug-ins (usually called "plugs") to provide various telephone-related functionalities. The plug is typically an electronic circuit board. Some telecommunication network has about 38 million plugs worth about $12.5 billion in assets. There are more than 10,000 different types of plugs installed and active in a wireline network, grouped in different plug families. One issue with this involves determining what are the appropriate locations and quantities of field spare plug inventory that should support network maintenance and growth. In general, field inventory is placed in local warehouses, work centers where field technicians report to, central offices (where the telephone switch resides) and technician trucks. The desire to avoid interruptions in service to end customers drove traditional spare inventory management schemes to overstock and deploy more spares in the field than actually needed in terms of managing the network.

At times, telecommunication companies have done massive recoveries that reclaimed the spares in the field. One way to reduce field inventory, among others, is to freeze purchases of the plugs and force the field workers to exhaust the spares that are in field trucks and local buffers. However, this method is crude and inefficient since it does not discriminate between highly critical and normal needs and it ignores amounts of overstocking at individual locations. Worse, the method can further promote hoarding behavior by rewarding field locations that overstock the most. In addition little attention has been paid to the proliferation of locations where spares are located. Multiple inventory locations lead to further increases in inventory through inventory duplication, negating the benefits of inventory consolidation. Finally, it is not sufficient to locate and size inventory appropriately. The improvement should be maintained over time. From there the need of establishing proper control tools and methods exist that measure the gaps that develop between ideal and real systems, and help sustain the benefits.

While commercial inventory software has been developed to address spare part inventory management, none addresses the unique set of circumstances and variety of needs described above, which are typical of telecom service provider companies.

Until recently, telecom service providers emphasized the delivery of excellent service with high levels of technician productivity, while the issue of excess field spare inventory was considered secondary and was addressed with crude methods such as freezing purchases and stopping shipments to the field. An additional challenge is to correctly design the process tasks that need to take place to initially deploy an inventory system of this nature, since in its initial state management of field inventory is usually completely decentralized, inventory warehousing locations are not where they should be, and field policies and metrics favoring customer service over efficient field inventory management are in place. Furthermore there are usually not adequate data collection methods and standardized data repositories in place to help in the implementation of more scientific methodologies. Hence there is need for a well-defined, transparent process to undertake this transition.

SUMMARY

Embodiments of the present disclosure provide systems and methods for implementing a field supply chain logistics system for managing spare parts inventory. In one embodiment, the method comprises: identifying locations for field service locations (FSLs) field warehouses for the spare parts, based on time or distance windows to deliver the parts to the field locations each FSL serves; collecting and validating data to compute optimal field inventory levels and minimum inventory levels for non-field warehouse, the non-field warehouse including central stock; physically setting up FSLs so that the FSLs functions as field warehouses and receive plug requests; generating optimal inventory profiles; opening FSLs for service; conducting plug inventory to retrieve plug excess and deploy new levels; and conducting after implementation review to verify that processes are being followed as expected and document lessons learned.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10 is a block diagram of an embodiment of a supply chain logistics system illustrating categorization of spare plugs based cost and relative use (or demand) for the plugs as an additional factor.

DETAILED DESCRIPTION OF THE DISCLOSURE

Figure 1:
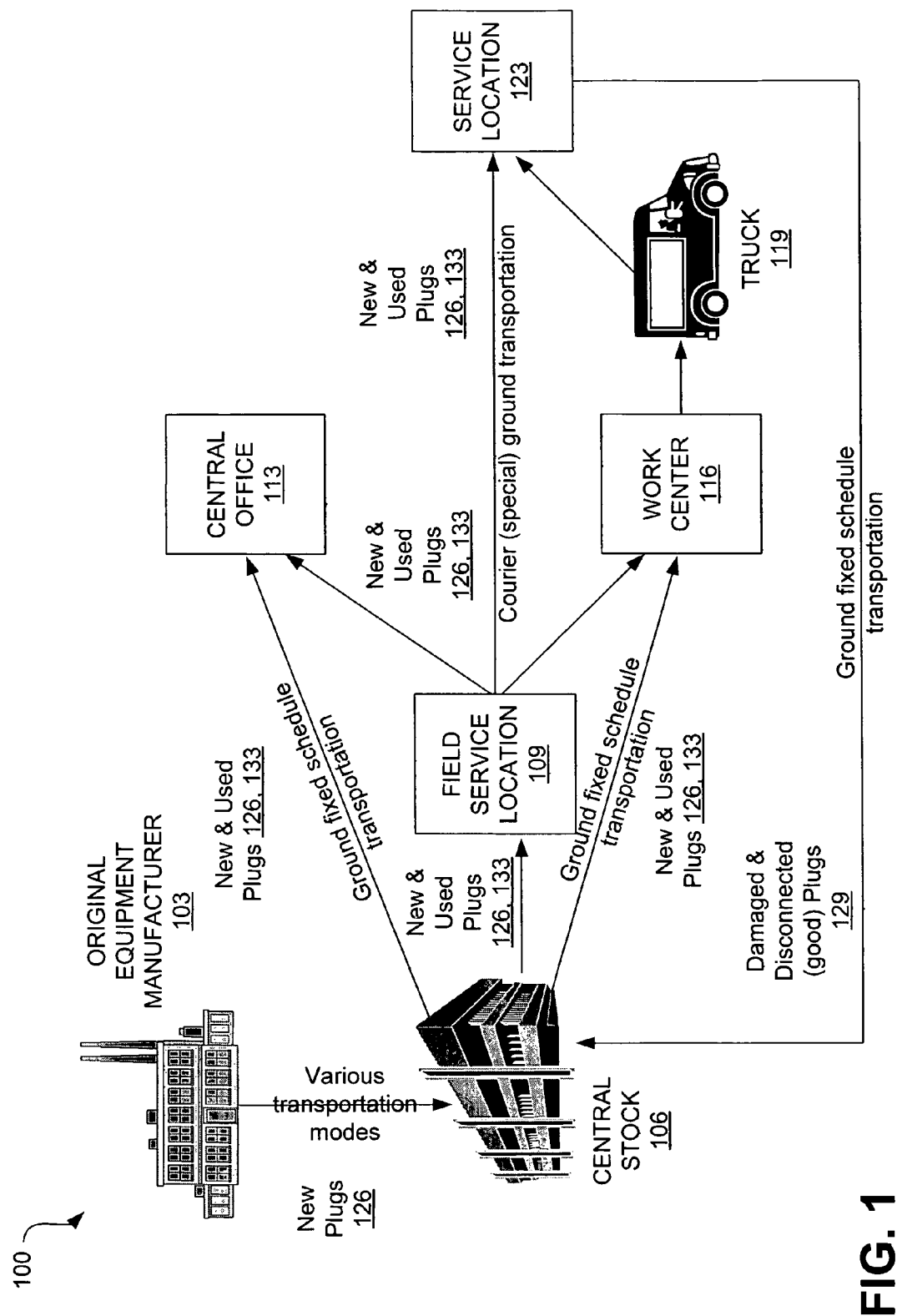
FIG. 1 is a systematic view of an embodiment of a supply chain logistics system for spare inventory management, including inventory locations and transportation links.

Referring now in more detail to the figures, FIG. 1 is a systematic view of an embodiment of a supply chain logistics system for spare inventory management. The supply chain logistics system 100 includes one or more trucks 119, one or more work centers 116, one or more central offices 113, one or more service locations 123 and one or more field service locations (FSLs) 109. The supply chain logistics system 100 deploys and transports plug inventory to places where it is needed, e.g., the central offices 113 and telecommunication service locations 123 where plugs are installed and in working status to support the telecom network traffic. The Supply Chain logistics system 100 provides management and calculation of plug inventory levels for the following types of locations: Trucks 119, Central Offices 113, Work Center supervisory stock 116, and Field Service Locations 109. In addition, the Supply Chain logistics system 100 can calculate minimum inventory levels for certain types of plugs at Central Stock 106. A set of inventory levels is commonly referred to as profile. For the purposes of this disclosure all locations mentioned are considered Field inventory locations except for Central Stock 106 and OEMs (original equipment manufacturer) 126.

The service locations 123 can be remote terminals having an open cabinet with installed plugs and space for installing additional plugs. The central office 113 can include cabinets where plugs are installed and some spare plugs are inventory. The work centers 116 are administrative locations where technicians report to and where they store their service vehicles (Truck 119). The work centers 116 can store spares, usually in the form of technician supervisor stock. The technician store spares they commonly use for their daily work in their truck. The field service locations (FSLs) 109 store spares and deliver the spares to places where they are needed. Original equipment manufacturer 103 manufactures the plugs and then ships them to central stock warehouse 106. There exist as well other vendors of used plugs that are not OEMs. Central stock 106 also receives damaged & disconnected (good) plugs 129 as a reverse logistics flow. Many times, the damaged & disconnected (good) plugs can be inserted back into the field as used plugs 133. The damaged plugs need to be repaired first (process not shown). In one embodiment, an inventory modeling tool incorporates in its assessment of cost effective inventory levels the fact that repaired plugs are usually cheaper than purchased ones, disconnected plugs are already owned and only minor transaction costs are involved in redeployment. The inventory modeling tool is later described in relation to FIGS. 7 and 8.

The supply chain logistics system 100 is linked by or associated with a transportation system as follows: The new and used plugs 126, 133 are delivered from the central stock 106 to a field service location (FSL) 109, central office 113 and/or work center (WC) 116 via, for example, ground, fixed schedule transportation. As such the central stock 106 performs an inventory replenishment function, as well as supports requests that cannot be fulfilled by field service location 109, central office 113, work center 116, and truck 119 due to, for example, stockouts in these locations or less urgent nature of plug needs. The field service location 109 supports the central office 113 and work centers 116 with plugs 126, 133 for spare maintenance and provisioning scenarios, but not inventory replenishments. The field service location 109 can satisfy local immediate needs in the geographical area it serves. Hence, the field service location 109 serves to deliver the new and used plugs 126, 133 to the central office 113 and WC 116, which are in its vicinity. Deliveries are performed via, for example, ground courier.

The technician in truck 119 of the supply chain logistics system 100 drives to service location 123 where the technician installs the new and used plugs 126, 133. The technician can also occasionally deliver plugs from the work center 116 to a service location 123. Both the FSL 109 and the work center 116 can deliver the new and used plugs 126, 133 to the service location 123 where the technician replaces damaged plugs 129 with the new and used plugs 126, 133. With less frequency other plug moves can occur, such as transfers of plugs between trucks 119 (e.g., usually technicians will drive to a meeting point) and more complex moves between FSLs. Generally, all ground scheduled transportation works based on fixed routes and is on a regular schedule. Therefore additional plug moves do not usually incur extra costs. In contrast courier deliveries may be based on variable charges. The relationship between inventory and transportation cost is described in relation to FIG. 2.

In one embodiment, a technician of a truck 119 receives a service message from the field service location 109 to investigate the service location 123 for malfunctions. The technician identifies the problem and replaces the damaged plugs with the new/used plugs. The technician records identification numbers of the new/used and damaged plugs 126, 133, 129 for tracking and monitoring of the plugs. The supply chain logistics system 100 records the identifications of the technician, truck bins, and service location associated with the replacement of the damaged plugs. The supply chain logistics system 100 can track the movement of plugs using the recorded identification numbers. By tracking the movement of plugs, the supply chain logistics system 100 can manage the plug inventory within the system 100.

Figure 2:
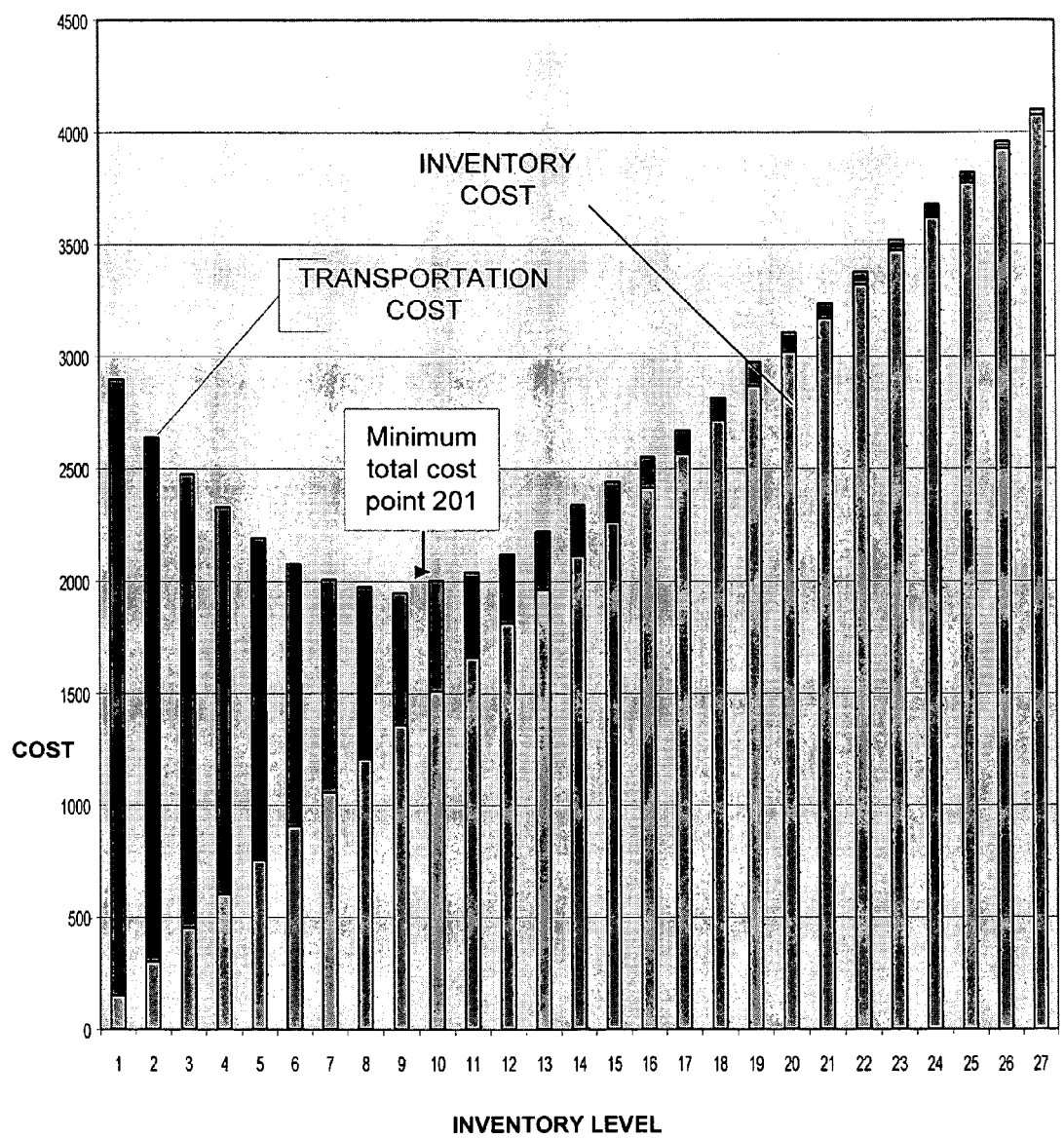
FIG. 2 is a diagram that illustrates the tradeoff of inventory and transportation costs in a Supply Chain logistics system inventory such as displayed in FIG. 1.

FIG. 2 shows an inverse relationship between inventory and transportation cost that the supply chain logistics system 100 can factor in management and calculation of plug inventory levels for the various locations. More frequent deliveries and therefore higher spending in transportation can lead to lower inventory levels, while infrequent deliveries can cause inventory levels to rise in order to avoid stockouts. In the figure, point 201 indicates the lowest cost point. Specifically inventory quantities and transportation frequency are linked via time for replenishing inventory, or lead time.

The supply chain logistics system 100 can further factor in the relationship between tactical deployment of inventory levels and variable courier costs. The supply chain logistics system 100 can use these costs as additional input in the calculation of inventory levels (profiles).

In one embodiment, the implementation of the supply chain logistics system 100 generally begins in an environment where inventory has been managed in a decentralized fashion by a number of geographical districts. One embodiment of the implementation process is described in relation to FIG. 3, as disclosed below. During initial implementation the usefulness of the profile goes beyond setting inventory levels by location and plug type. The profile also provides information, that includes, but is not limited to, size and scope of the region (zip code, location and addresses), location of facilities within the region, the names of technicians in the region, their location within the region, their job responsibilities, their skill sets, criticality of the plugs, and usage data of the plugs, for example.

Figure 3:
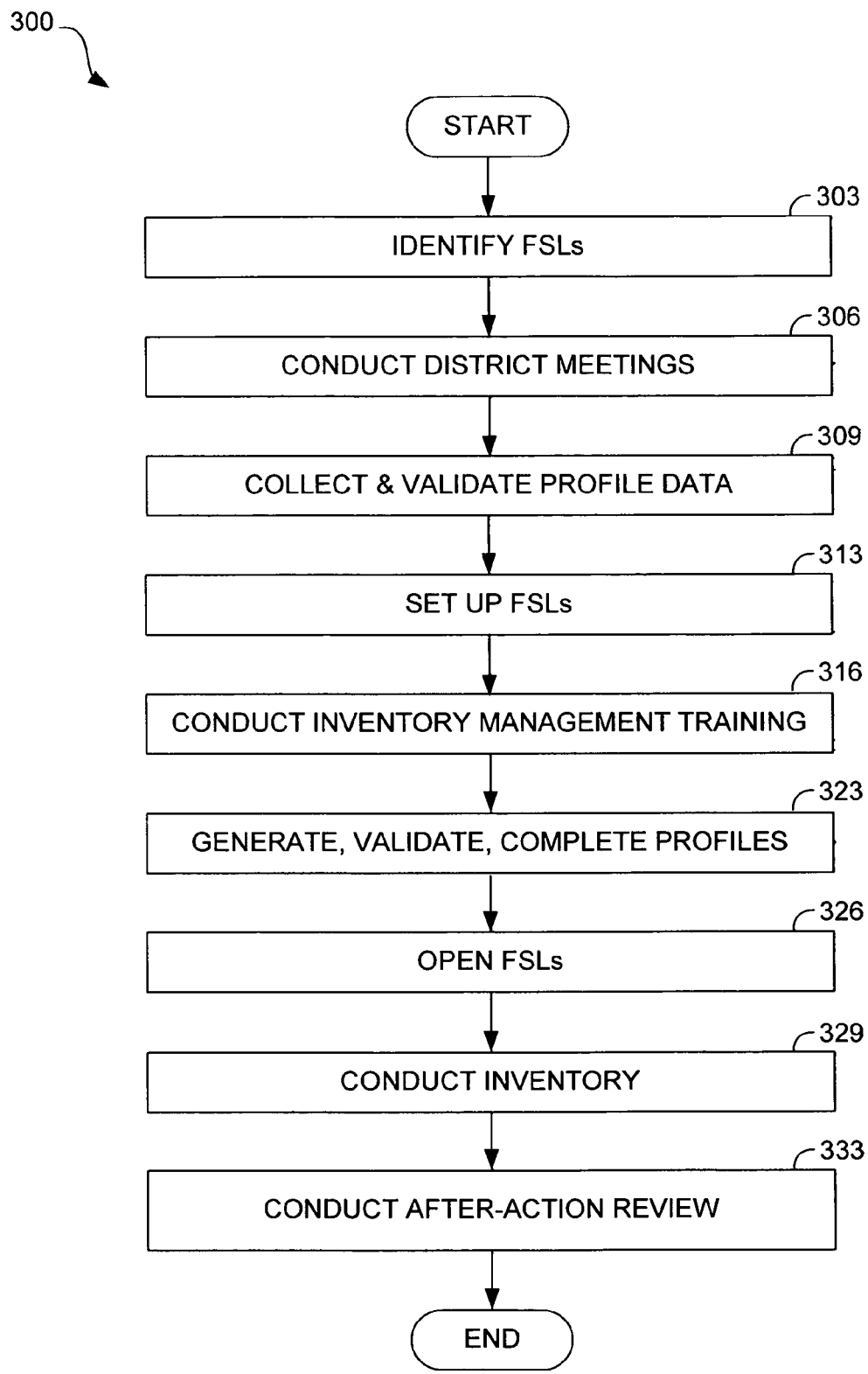
FIG. 3 is a flow diagram that illustrates an embodiment of an operation for implementing a supply chain logistics system.

FIG. 3 is a flow diagram that illustrates an embodiment of an operation for implementing a supply chain logistics system. The operation 300 includes, as shown in block 303, identifying field service locations in a region, which is described in more detail in relation to FIG. 4. The field service locations are determined using an iterative process, which is described in more detail in FIG. 5. In block 306, district meetings are conducted to introduce to the field managers the new inventory management processes and attempt to ensure their buy in. An initial communication package can be distributed in the district meetings to users of the supply chain logistics system. The initial communication package may request the field personnel to provide information about each technician who is in the district, report their location, and job responsibilities and skill sets, for example. The initial communication package requests the size and scope of a region, zip codes, and addresses of facilities, for example. The collected information helps accelerate collecting and validating profile data of the region, as shown in block 309. Special tools have been developed to streamline this data collection process, such as location data wizard (LDW) described in relation to FIG. 13.

In block 313, once the profile data has been collected, and sotne times in parallel with the collection, the field service locations are physically setup. For example, appropriate shelving and computers are installed as needed. In block 316, users of the system receive inventory management training. For example, supervisors of the field service locations receive computer training to use the applications for managing, maintaining, tracking, and monitoring plug inventory and technicians.

In block 323, based on the profile data and field service locations, a field inventory profile of the district is generated, validated and completed. The profile is generated using an inventory modeling tool. The profile provides inventory levels to be implemented in the district's field locations, as a primary input, but it also includes, but is not limited to, location of facilities within the region (e.g., zip code, location and addresses), the names of technicians in the region, their location within the region, their job responsibilities, their skill sets, criticality of the plugs, and usage data of the plugs, for example.

In block 326, the field service locations are opened for service with the types and number of plugs based on the profile of the region. In block 329, the operation 300 includes conducting plug inventory at the field service locations. The plugs are counted and categorized in field locations so that this information can be reconciled with the operational supply chain logistics systems. The plugs are deployed in new inventory levels at field locations other than FSLs. Excess plugs are consolidated so that they can eventually be returned to central stock 106. For example, the plugs are pulled out of the trucks 119 based on sequence and schedule, and brought into a supply room of a work center 116.

From the supply room, an inventory management team uses a field inventory standing tool to obtain the identification of each truck 119 and determine the types and number of plugs that the truck 119 is authorized to obtain from the supply room. The field inventory standing tool provides a list of types and number of plugs to obtain from the supply room. Then, the inventory management team scans a plug in the supply room via the field inventory standing tool, which then matches the scanned plugs with a plug inventory profile that was loaded in the field inventory standing tool. The plug inventory profile is generated as part of the region profile. The field inventory standing tool instructs the team to keep the plug for the inventory of the truck bin 119 or leave the plug in the supply room. In addition, the field inventory standing tool tracks the number and types of plugs assigned to the truck bin 119. The field inventory standing tool can be a scanner or a computer connected to a scanner. The field inventory standing tool indicates which plugs stays or leaves the field service location 109, central office 113, and work center 116.

If the scanned plugs are declared excess according to the field inventory standing tool, the scanned plugs stay in a separate area in that supply room. If the scanned plugs are declared keepers, the scanned plugs are put aside to be put back on the truck bin 119 within the next few minutes when the inventory management team inventories the truck bin 119 and completes the plug inventory process. The truck bins 119 are inventoried and excess plugs are received at that supply room. The field inventory standing tool transmits information of the plugs that are declared as excess for that work center 116 to the supply chain logistics system, and the excess plugs are placed on a dock outside the work center 116 for pickup that night.

In block 333, the inventory operation 300 further includes conducting after-action review, which is generally conducted a few months after the new inventory processes have been implemented. This is to review whether personnel are performing their responsibilities as expected to ensure success of the system 100. Once the spare plugs are placed in their desired location, the inventory modeling tool can be used in steady state mode to maintain and fine tune field inventory plug inventory profiles for FSLs and truck bins, which are updated periodically, at least quarterly using the inventory modeling tool. In addition, monthly meetings are held to share strategy and forward views of demand/deployment impacts to the supply chain logistics system. The system can deploy a consistent and controlled mechanism for changing profiles on an ad hoc or as needed basis.

After initial implementation, the plug inventory profile for each location and plug type is maintained in steady state by periodically reviewing (e.g., monthly, quarterly, etc.) as part of an ongoing process that fine tunes profiles based on changes. The inventory modeling tool generates reports that detail the recommended changes to the plug inventory profiles (e.g., minimum levels for central stock and recommended levels for FSL, CO, WC, and truck). Local Network managers are responsible for implementing changes to plug inventory profiles based on recommendations of the inventory modeling tool. The inventory profiles are updated on an as needed basis by the area manager responsible for a given area. The area manager approval may be needed prior to updating an inventory profile. Feedback from area managers is used to constantly improve the mathematical and statistical algorithms embedded in the tool.

A set of facility location mathematical optimization models is used to determine where to setup field service locations in a region. In general, the FSLs are placed in the region so as to minimize transportation time from customer locations to field service locations, while opening as few facilities as possible to minimize costs. The facility location mathematical optimization models usually factor in a service constraint tied to distance or time from customer locations to FSLs.

Figure 4:
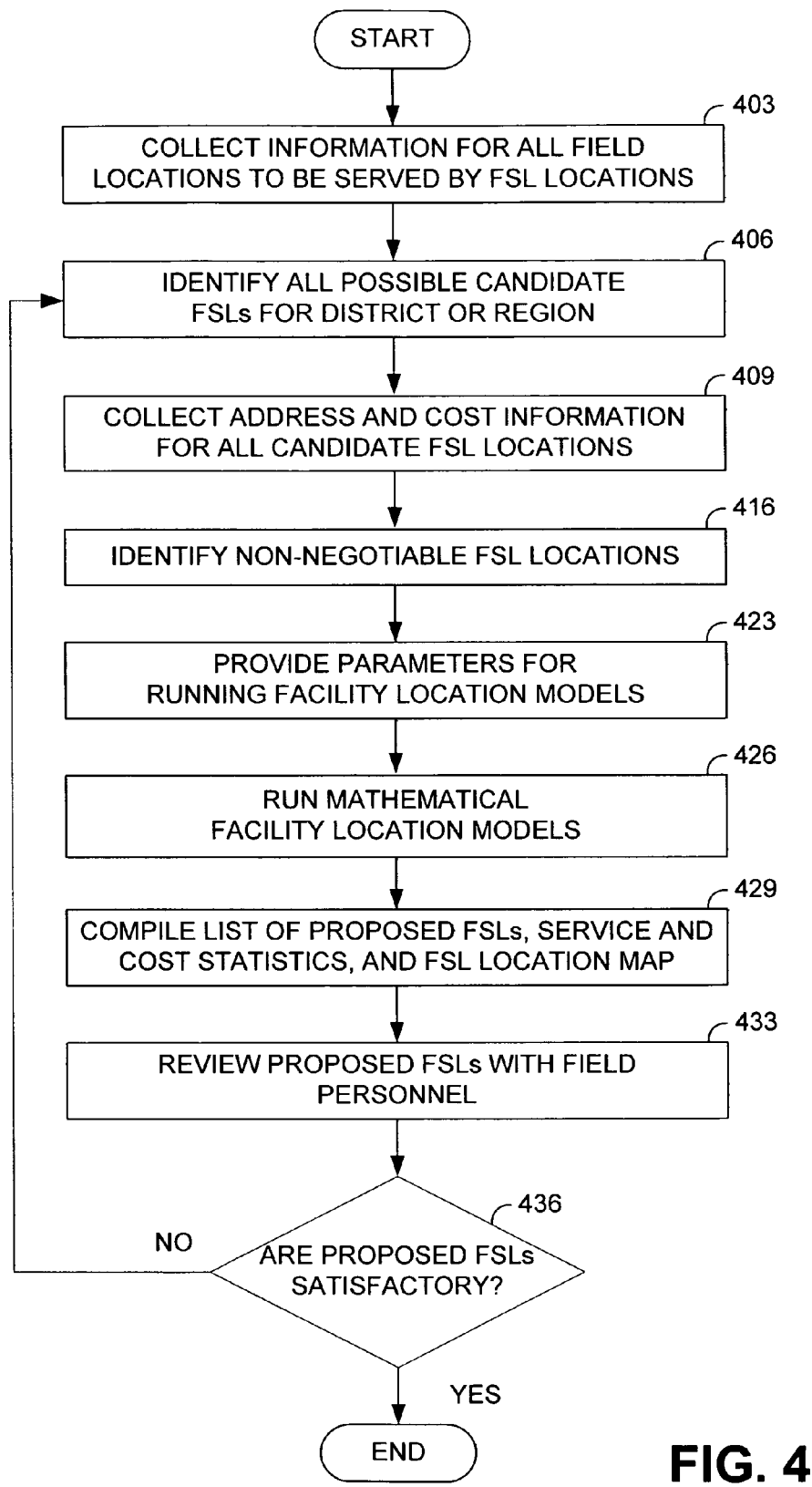
FIG. 4 is a flow diagram that illustrates an embodiment of a process for calculating a list of proposed field service locations.

The determination of FSL locations follows an iterative process as described in FIG. 4. Beginning with block 403, the process starts by gathering information about the field locations in the district or area to be served by the future FSLs. In general, precise address information, or latitude and longitude information are used to pinpoint location. Other information can be gathered, such as indicators of future traffic between the serving FSL and the location. Possible indicators are number of technicians if the field location is a work center, or annual plug usage.

In block 406, possible locations are identified that could become FSLs. Typically FSLs are collocated with a field location (so no new facilities need to be purchased or rented). In addition the FSL should have sufficient available space to deploy shelving and accommodate FSL personnel, among other requirements. It is typical that at this stage very little will be known about many customer field locations, so they will be included as candidates by default.

In block 409, the address and cost information for all candidate FSL locations are collected. In block 416, locations that will for certain be proposed in the serving FSL set are identified. Such non-negotiable locations are usually FSLs that are already open for other districts and located within a reasonable distance from the customer field locations in the district currently being analyzed. In other cases these are locations already known to satisfy FSL requirements, such as adequate shelving and space.

In block 423, managerial parameters are provided and used when running mathematical models. Such parameters are usually phrased as constraints imposed to the solution. For example no more than 10% of the technicians in the district should be served from an FSL that is more than 60 minutes away. Or, there should be no more than 5 FSLs serving the district. Or, no more than 3 customer field locations should be served from FSLs that are out of state.

There are three types of facility location optimization models as described in block 426: set covering model, minimum uncovered tech model, and uncapacitated facility location (UFL) model. The three models use an operations research mathematical technique known as mixed integer programming in order to arrive to a solution (e.g., set of proposed FSLs). The mixed integer programming models are defined in terms of an objective function and a set of constraints. These three models differ in terms of the constraints they handle and the main objective they pursue. In addition the models have support programs which prepare the data inputted into the models.

The set covering model calculates the minimum number and location of FSLs that can serve field customer locations (Central Offices and trucks) within a region within a fixed time or distance window. The mathematical equation would be expressed as:

Minimize number of FSLs serving the set of field customer locations, subject to:
    Each customer location should have exactly one (1) serving field service location, and
    Each customer location is inside the, for example, 60-minute time range of its serving field service location.

The set covering model is used to have a first estimate of the maximum number of FSLs for serving an area given specific service constraints (service time windows).

The minimum uncovered tech model starts with a desired fixed number of FSLs provided as a parameter. It determines the location of the FSLs among the candidates provided so that the total number of technicians whose reporting location is outside the time-window covered scope from its serving FSL is minimized. The model is flexible enough to accommodate variations of this concept. For example, if a technician reporting location is not within a 60 minute time range from the FSL an annual dollar technician productivity loss could be assessed, and this cost could be greater than the productivity loss suffered by an IM type technician. Such scenarios can be accommodated by this model so that instead of minimizing a number of technicians, total productivity costs are minimized. Productivity costs should be provided as inputs to the model for each technician.

The minimum uncovered tech model minimizes the number of technicians outside the preset time range window, subject to:
    Each customer location should be served by exactly one FSL
    There should be exactly X FSLs (the desired number) in the proposed solution The minimum uncovered tech model is used when there is insufficient budget to open all the FSLs proposed by a Set Covering model, or when the constraints imposed by the time windows are a key driver but can be somewhat relaxed. The simple minimum uncovered tech model "pulls" proposed FSL locations closer to field customer locations with many technicians. As such the minimum uncovered tech can provide a location with many technicians with a higher probability to fall well within the desirable service radius specified as a parameter. In other words, minimum uncovered tech model maximizes the proximity of FSLs to the majority of technicians.

The uncapacitated facility location (UFL) model determines the number and location of FSLs simultaneously such that the total logistics costs are minimized, subject to coverage time window constraint. The total logistics costs can include the following elements:
    Costs to open and operate FSLs: annual operating costs and prorated fixed costs to establish a FSL
    Transportation costs: annual transportation costs to deliver plugs to the field locations
    Transportation costs=Transportation Costs per Shipment*Annual Shipments
    Productivity costs: annual productivity costs of technicians when technicians are waiting for the plugs to be shipped
    Productivity costs=Productivity costs per hour*Time per Shipment*Annual Demand
    The uncapacitated facility location model can also factor penalty costs. That is when a customer location is outside of the, for example, 60-minute time range from its serving FSL, it causes an additional penalty cost. In words the mathematical equation would be expressed as:

Minimize the sum of the following costs, for all FSLs proposed in the solution:
  Annual prorated cost of opening FSL
  Cost of supplying annual requested plugs from the FSL to the locations it serves, including courier and productivity costs
  Penalty cost associated with FSL being outside desirable time window, for each customer location outside of the desirable time window
Subject to the following constraints:
  Every customer location should have exactly one FSL serving it
  The effective time window for each customer location should not be larger than a maximum time window, for example 120 minutes The penalty cost associated with a location outside the desirable time window is mathematically described so as to grow as an exponential function as the time window increases. The penalty is infinity when the maximum time window is reached, effectively preventing the optimization from having field customer locations outside the maximum time window.

From a business perspective, the penalty is made so that it represents an estimate of the damage caused by not having the plug when it is needed, beyond logistics and technician productivity costs. This damage could be associated with end-customer fines, or end customer churn.

The uncapacitated facility location model is generally used when costs are a primary factor in deciding FSL locations, and also when the number and location of FSLs is needed simultaneously. It has as drawback that a substantial amount of data is needed in order to run the model. Block 426 includes the preparation and running of the models based on the information obtained in previous blocks.

In block 429, the models generate a list of proposed FSLs and the field locations they serve. Additional statistics are provided, with special emphasis on reporting how well the solution proposed fits the parameters specified, how costly it is (if costs were used to run the models), and a visual depiction (map) of the proposed FSLs and the locations served.

In block 433, the set of proposed FSLs is reviewed by field and staff managers. Generally, on-site visits to proposed FSL locations are arranged and some FSL(s) in the solution may not be considered appropriate after visual inspection. FSLs could be excluded because appropriate transportation providers (e.g., usually couriers) are not available at the location chosen. In block 436, if the proposed FSLs are not satisfactory, the process then restarts in 406 excluding non-desirable candidate locations. The process is much faster and easier in successive iterations since most of the information has already been gathered and the solution only needs minor modifications.

Figure 5:
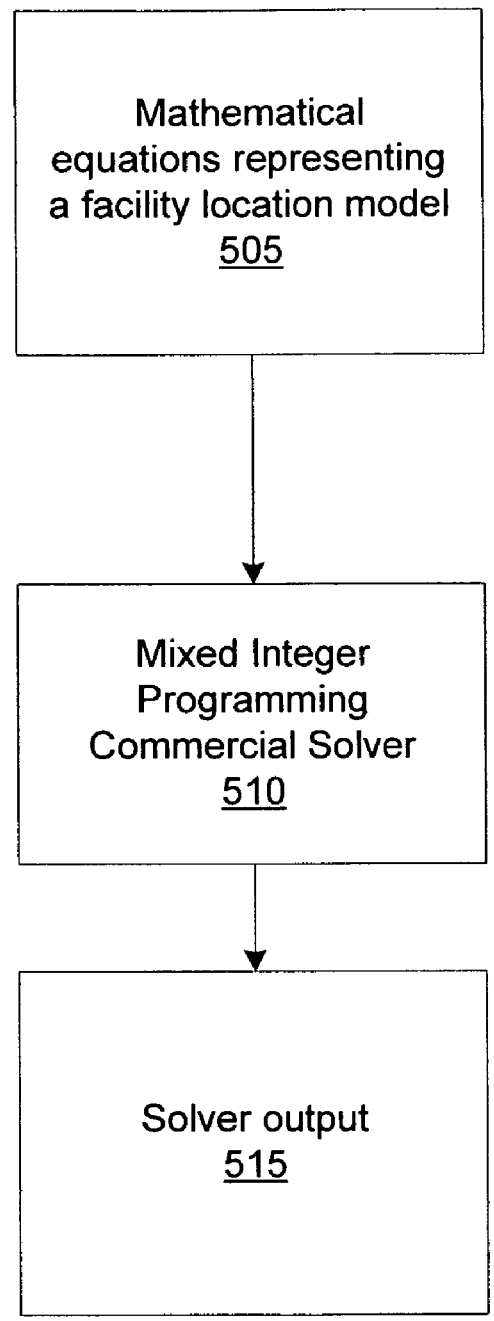
FIG. 5 is a flow diagram that illustrates an embodiment of an operation for determining field service location.

FIG. 5 depicts the high-level process of calculating a list of proposed FSLs, such as shown in FIG. 4 in block 426. Beginning with block 505, the calculation includes providing mathematical equations representing a facility location model. In block 510, mathematical equations are inputted in a commercial mixed integer programming solver software application that translates the mathematical equations associated with the facility location model into code. In block 515, the application provides a list of proposed FSLs.

Figure 6:
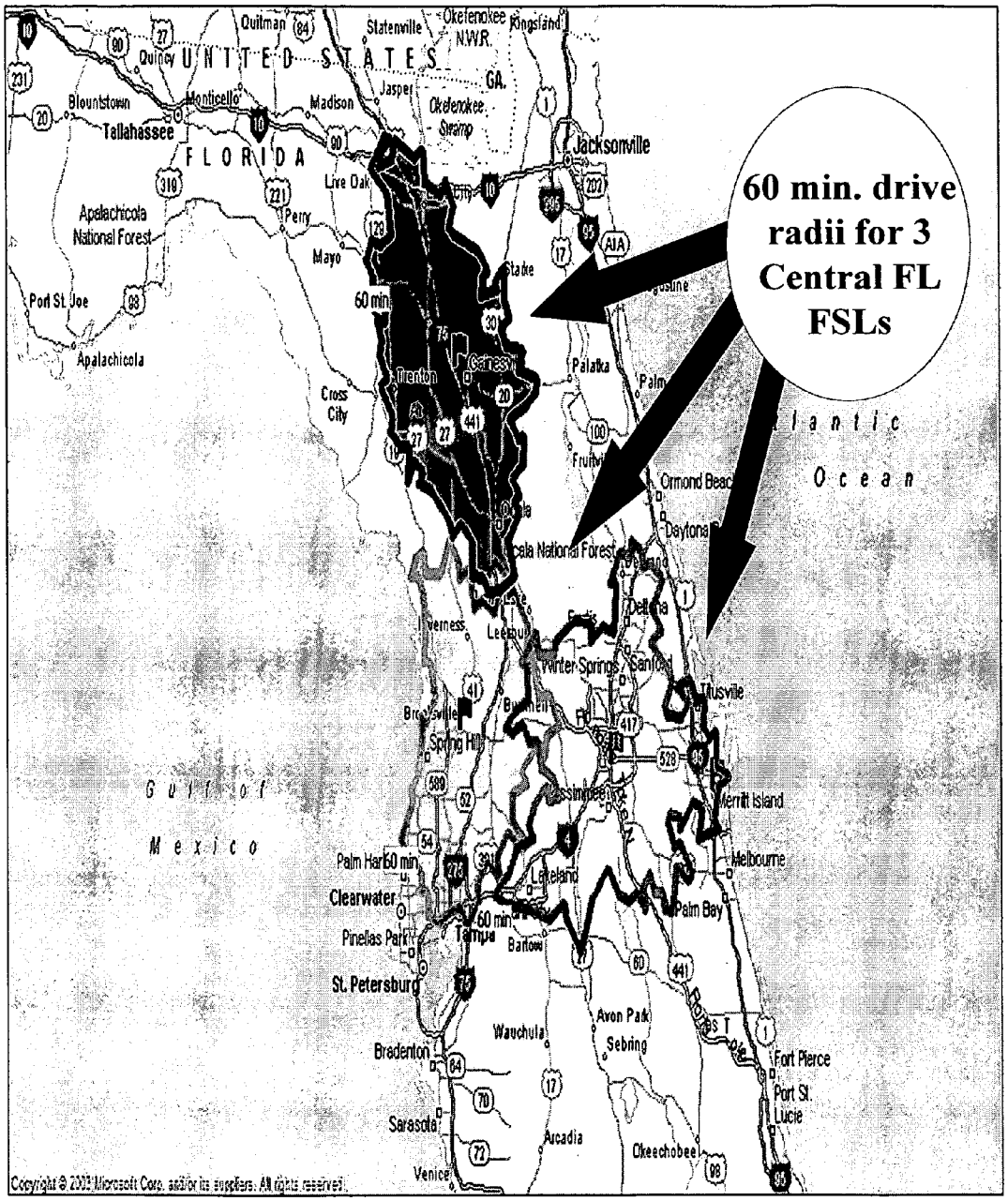
FIG. 6 is a pictorial diagram that illustrates the state of Florida in the United States having three (3) field service locations.

FIG. 6 is a pictorial diagram that illustrates the state of Florida in the United States having three (3) field service locations that can provide service operation within approximately two (2) hours of a plug request or approximately 60 minutes of driving time. The remaining time that completes the two hours is used for administrative tasks. Well-located FSLs shown in FIG. 6 such as these may have service areas that cover distinctive areas and slightly overlap, while no or very few field customer locations may fall outside the specified radius or driving time. The presence of highways elongates the FSL service areas when field customer locations are served via ground transportation.

Estimation of administrative time is a factor when a constraint of serving within X hours is imposed. Administrative time associated with specific plug requests can be subtracted from total time available to perform the ground delivery of the plug. The following are examples of FSL administrative tasks that at least some FSLs perform:
  Handles incoming calls for an area
  Identify requested plug location and arrange transportation
  Records calls using Call Log
In addition FSL personnel perform other tasks such as inventory maintenance functions.

Figure 7:
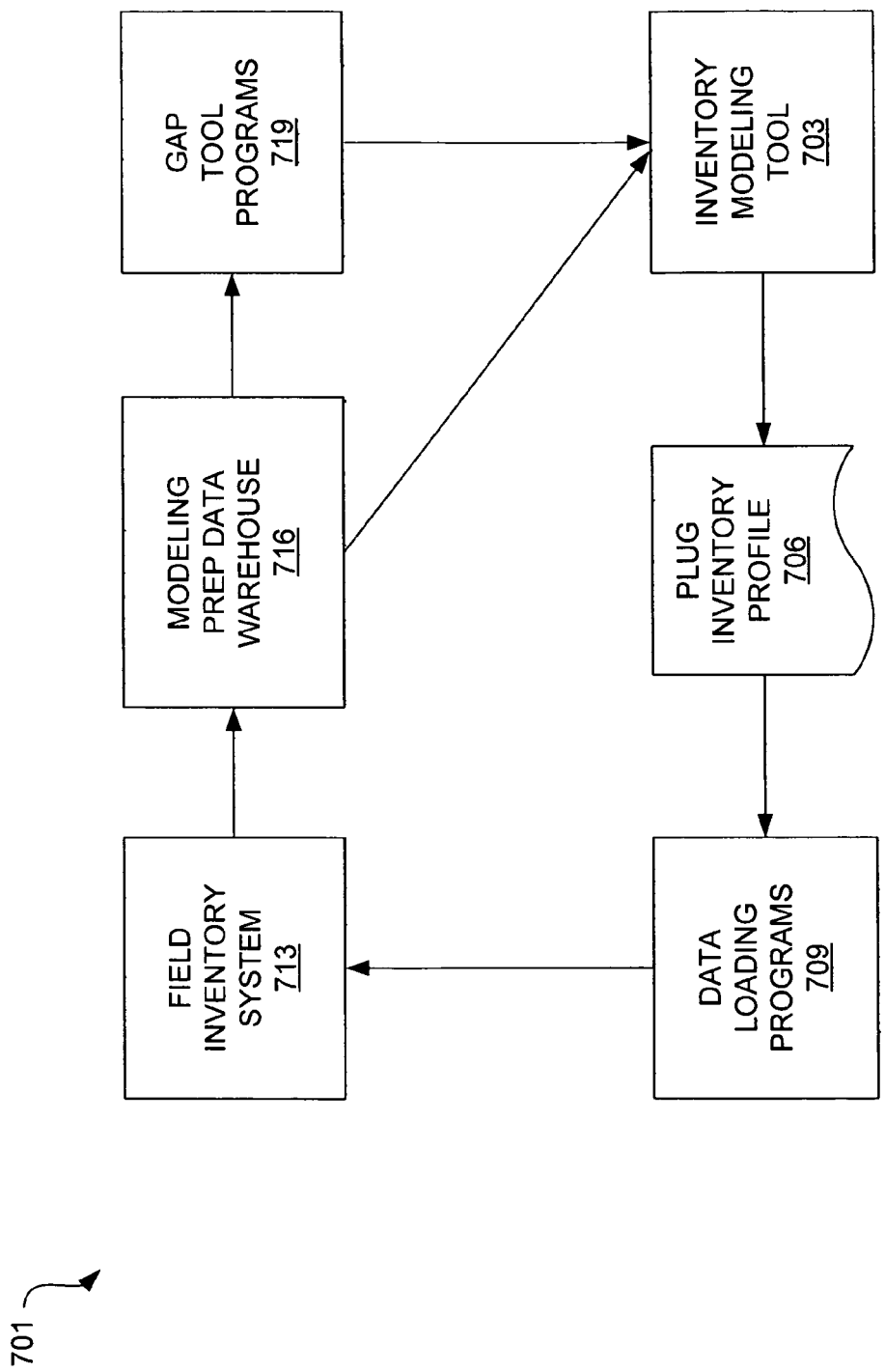
FIG. 7 illustrates a block diagram representing the overall set of system-processes for managing spare plugs in a region, with an emphasis on the interaction of data and tools.

FIG. 7 illustrates a block diagram of an embodiment of a plug modeling system-process for managing spare plugs in a region, from an information systems and data perspective. The plug modeling system-process 701 comprises an inventory modeling system 703, which determines the plug inventory profile 706 for the region. The inventory modeling system 703 are described in relation to FIG. 8. The inventory modeling 703 is capable of identifying demand patterns which fall outside of what would be considered "normal". Since the profiles have as main objective to fulfill service requirements under normal conditions, abnormal or outlier demand is excluded prior to profiling. The exclusions are based on a mathematical algorithm with is based on the probability of occurrence of the observed demand. The inventory modeling system 703 obtains information about demand patterns and technician skill sets, for example, to process and generate the plug inventory profile 706.

In addition, gap tool programs provide the inventory modeling system information regarding "problem" areas, where performance is not up to par, so that the inventory modeling systems can be applied to correct inventory deficiencies and so as to, again, continuously improve algorithms and the quality of the data used to generate inventory profiles. The final profiles, after review by Network managers, are then transferred to data loading programs, which load the information to field inventory operational system 713. The gap tool programs are described further in relation to FIG. 13

Figure 8:
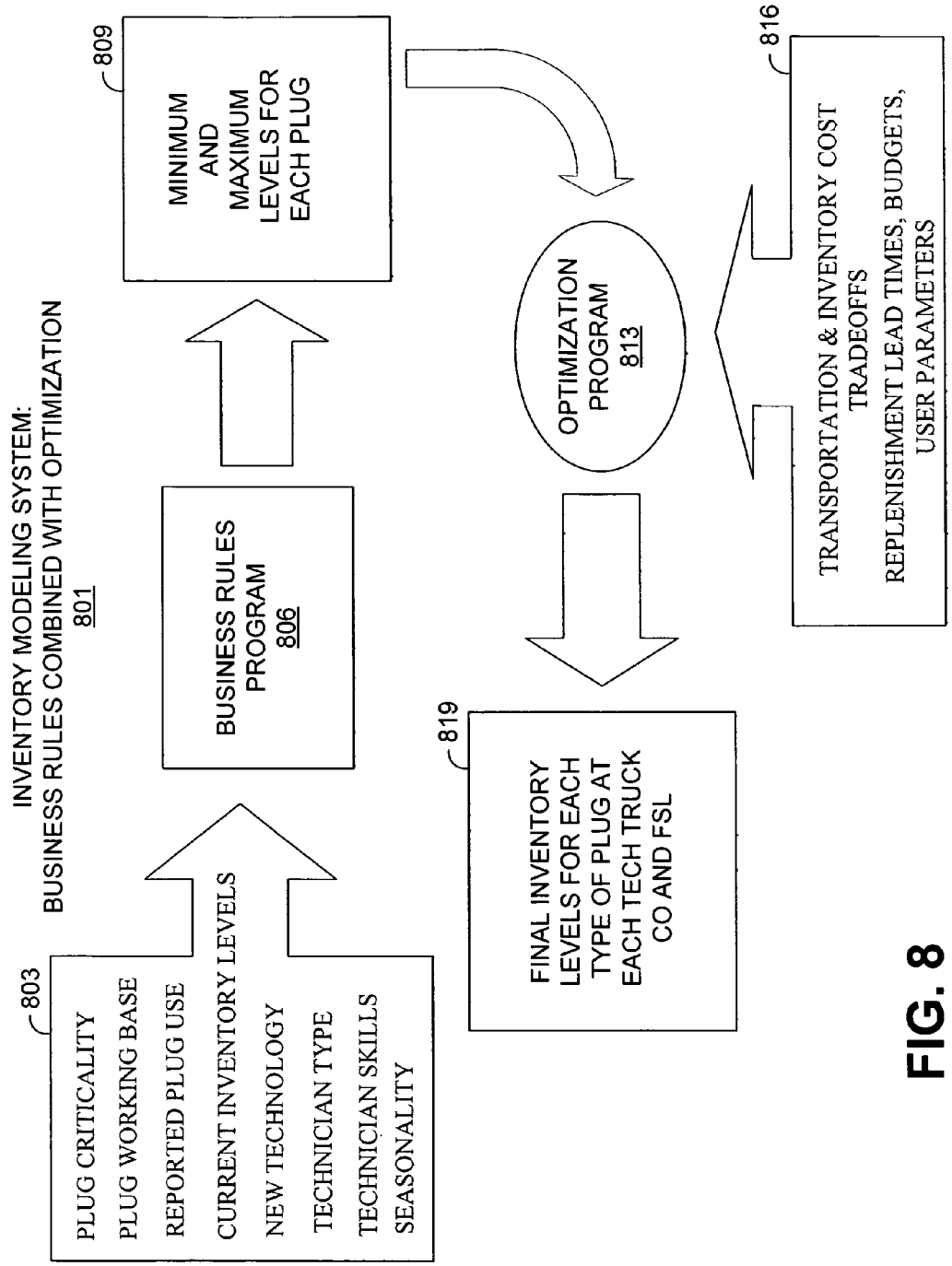
FIG. 8 is a block diagram of an inventory modeling tool used for determining field inventory levels, such as that shown in FIG. 7.

FIG. 8 is a block diagram of an embodiment of an inventory modeling system 703, such as shown in FIG. 7, having business rules combined with optimization. The inventory modeling system 801 includes obtaining field data 803. Among other information the following is collected:
  List of field locations (Central Offices, Work centers, trucks, FSLs)
  Hierarchical relationships between the locations (e.g., which FSL is assigned to serve a particular Central Office)
  Historical and forecasted demand patterns for each type of plug
  Urgency of the need for plugs (criticality)
  Type of technician and individual technician skill set
  Installed ("working") base for each type of plug
  Substitutability relationships between the different types of plugs
  Availability of plug in the market (i.e. manufacture discontinued status)
  Degree to which plugs are being reused versus purchased new Costs
- Cost to purchase and maintain inventory at different types of locations
- Cost to transport a spare between different locations
- Productivity cost incurred if a technician is idle due to lack of a spare
- Newness of the technology and degree of deployment in the network
- Type of use given to the plug (blank, diagnostic, etc)
- Replenishment lead times
- Budget restrictions
- Plug failure rates The information gathered is used by business rules program 806 which determine the minimum and maximum inventory levels of each plug type allowed at each field location and for each different type of plug, as in block 809. The business rules program 806 allows for incorporation of business knowledge and forward looking factors that historical data alone is unable to provide. For example, the technician driving the truck 119 could have recently been trained in a new skill. His/her historical consumption of plugs may not reflect such change. A properly placed business rule can ensure that he/she is given a profile that includes a minimum amount of the types of plugs somebody with that skill set may use. Similarly a maximum level of zero could be applied across the board for plugs that have been issued a product change notice (PCN) and are being recalled from the telecom network. The business rules program 806 can also compensate for inadequate usage data, new technology needs, abnormal (outlier) usage (hurricanes), incorrect reporting, and incomplete data. The inventory modeling system 801 could be processed using a computer-related system.

Once the minimum and maximum levels for each plug and location are determined, the levels are provided to an optimization program 813. The optimization program 813 works within the boundaries of the business rules minimums and maximums to calculate inventory levels that minimize cost subject to user specified fill rates (e.g., minimum probability that demand will be met) for the various types of field locations and plugs. The optimization 813 relies on inputs from field data 803, and uses statistical probability distributions commonly associated with spare part failure patterns and spare demand in general to predict future needs. Other factors include special demand patterns, e.g., low volume, sporadic or lumpy demand, and availability of reusable plugs (e.g., disconnects and repairables) for redeployment. Inventory levels are determined based on service constraints (e.g., the aforementioned fill rate) and cost.

After the above constraints are satisfied a mathematical model of the optimization program assesses inventory vs. transportation and productivity costs in order to determine optimal inventory levels. In addition the model assesses achieved fill rates for field locations such as truck bin 119 or CO to ensure that for predetermined categories of plugs a collective fill rate requirement is achieved. The algorithm in 813, which is mathematically optimal, is a heuristic that looks at the largest contribution to service level per dollars deployed in an iterative fashion. The optimization program is further described in relation to FIG. 14.

Based on the calculations of the optimization program 813, the final inventory levels for each type of plugs at each work center, central office, truck bin, and field service locations are determined. In addition minimum Central Stock levels for low criticality plugs are calculated.

Figure 9:
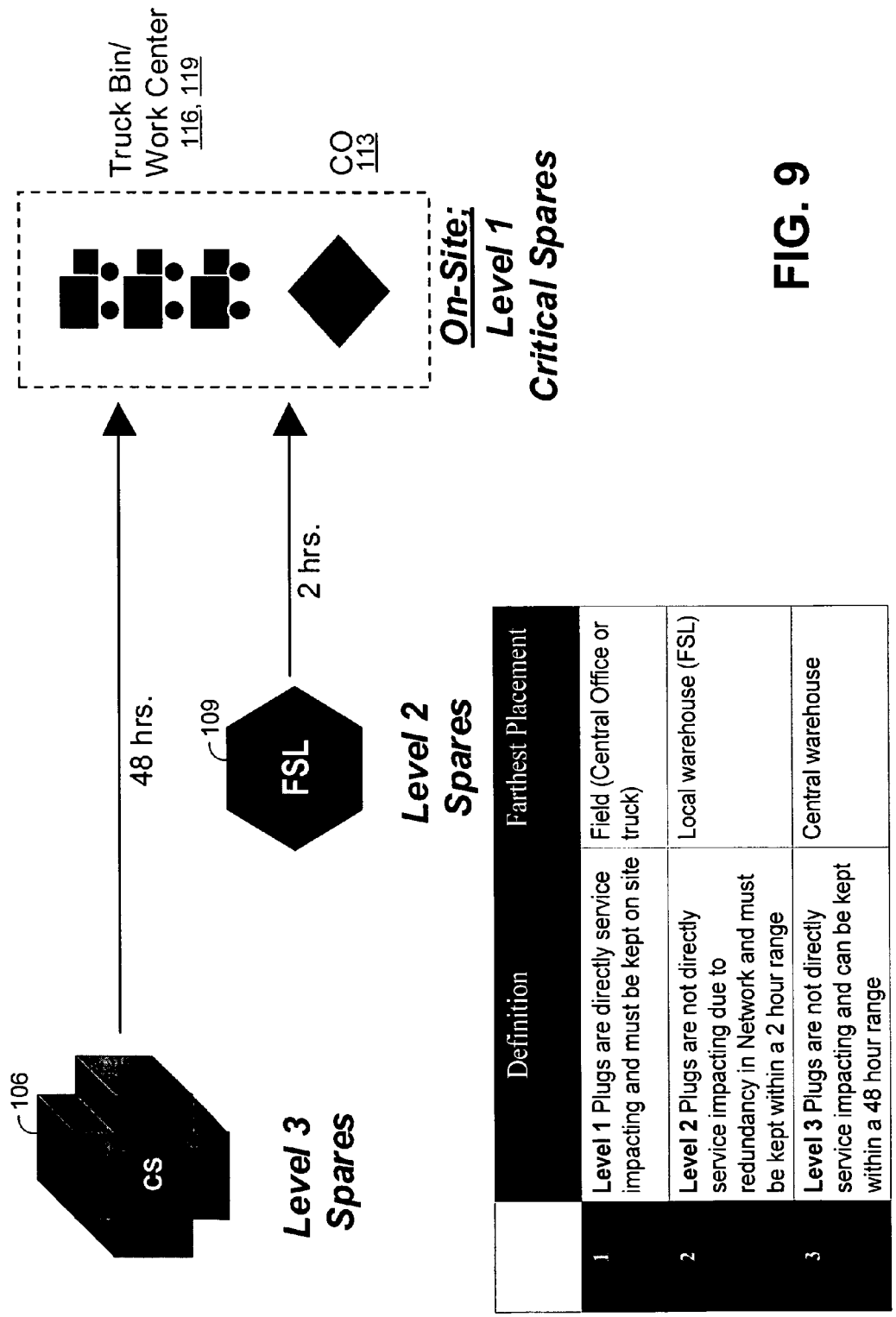
FIG. 9 is a block diagram of an embodiment of a supply chain logistics system illustrating categorization of spare plugs based on criticality.
Figure 11:
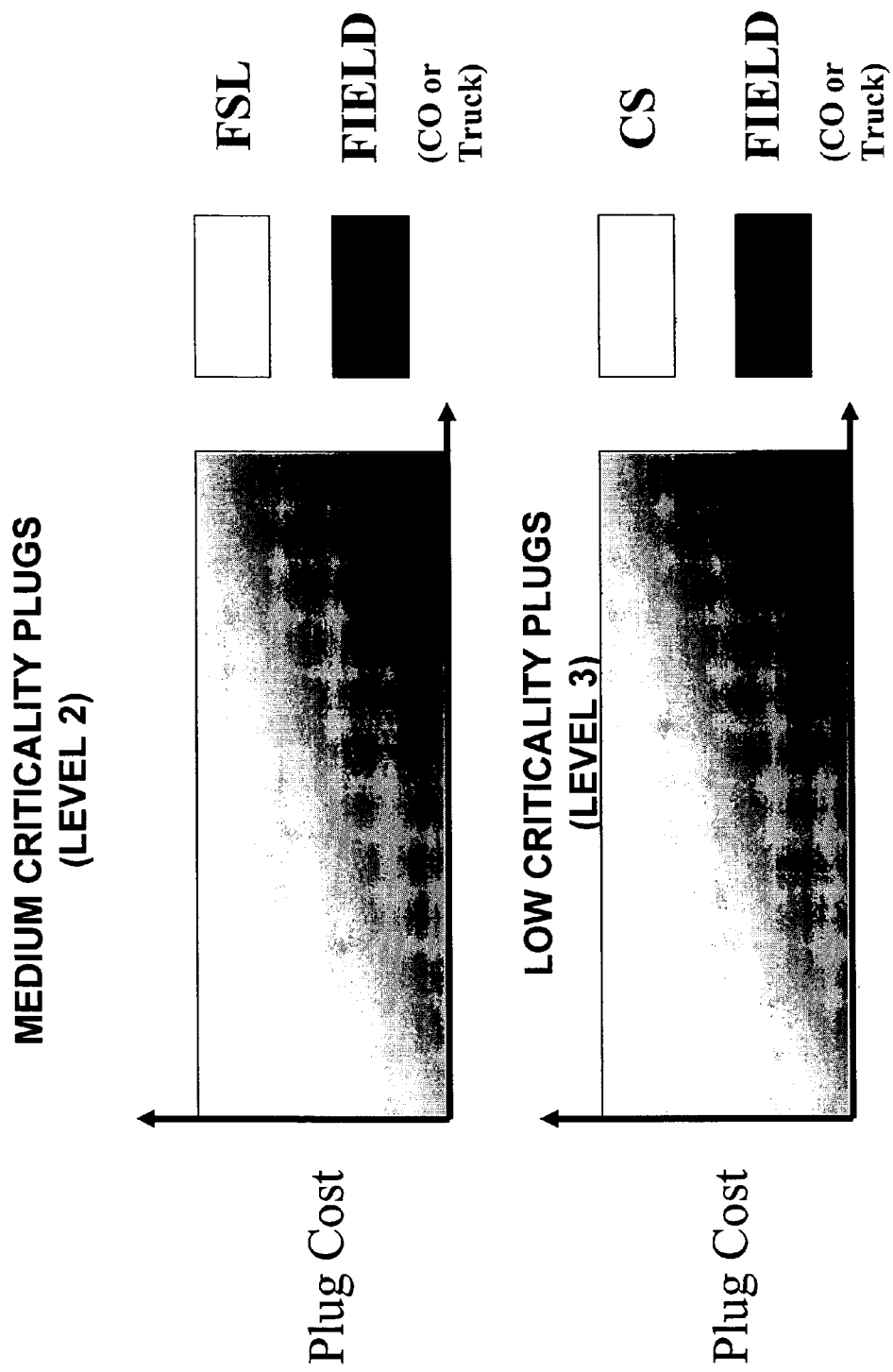
FIG. 11 is a block diagram of an embodiment of a supply chain logistics system illustrating categorization of spare plugs based how cost and demand affect inventory placement.

FIGS. 9-11 illustrate how inventory is placed in the Supply Chain Network based on the main characteristics of particular types of plugs. Referring now to FIG. 9 a block diagram of an embodiment of a supply chain logistics system illustrating categorization of spare plugs based on criticality is shown. Critical spare lists classify each plug in terms of its 'criticality', and that determines in part the stocking strategy for the plug.

The main criticality categories (there are others) are designated as Level 1, 2, and 3 based on the service impact of a plug failure. Level 1 plugs are directly service impacting and should be kept immediately available on site. Level 2 plugs are not directly service impacting due to redundancy and can be kept within a 2-hour range. Level 3 plugs are not directly service impacting and can be kept within a 48-hour range. It is to be noted that the times above are a function of transportation mode, facility location, and administrative time used to process the orders.

Criticality categories constrain how far from the point of use the plug can be located and, thus, impose in certain cases where service plugs should be deployed: at central office 113 or WC/truck bin 116, 119. Criticality is therefore a key driver for plug location, as indicated in FIG. 9A. The more time allowed to react the more opportunities to consolidate inventory and achieve economies of scale, effectively implying that there will be fewer FSLs than field locations, and even fewer Central warehouses. For example, a criticality 2 plug will usually be deployed at an FSL. The primary spare plugs maintained at FSLs are Level 2 Critical Spares for the work centers and COs in the geographic area covered by the FSL. The FSL is at the maximum distance from point of use allowed for this level of criticality, to benefit from inventory consolidation for the multiple locations it serves. In general FSLs serve to collect and standardize the use of buffer stock on trucks, and supervisor bins. The FSLs enable more aggressive plug profiling for low usage parts through greater pooling or sharing of low demand spares inventory.

Criticality is a factor in establishing the primary locations for plugs as shown in FIG. 10. However cost and demand are also factors in determining secondary locations for plugs. Plugs with high demand and low acquisition cost are likely to be placed closer to their final point of use to balance courier costs and achieve minimum total costs (point 201 of FIG. 2), while plugs with the opposite qualities (lower demand, higher cost) are positioned as far back in the Supply Chain as allowed by criticality. The final location for a plug is based in the combination of the demand, cost and criticality factors mentioned above. FIG. 11 illustrates this concept for medium and low criticality plugs (levels 2 and 3 respectively).

Level 1 plugs are usually deployed on site at central offices, work centers and trucks 113, 116, 119. However the inventory modeling system 703 will deploy Level 1 plugs at their secondary locations to satisfy an overall "system" fill rate requirements. It is important to highlight that fill rate can never be 100% because statistically that is impossible and would drive a prohibitively costly amount of inventory. So even though a relatively lower fill rate can be established for a field location (for example 95%), level 1 plugs can be stocked at the FSL to complement the critical stock in the field and together with the field location achieve a higher "system" fill rate (for example 99%) at a lower cost.

For the reporting only purposes plugs are classified in different demand (or usage) classes. A class is associated with each type of plug at each Central office or group of technicians reporting to the same supervisor. The plugs can be classified for each central office and group of technician trucks 113, 116 as follows:

Fast/High Demand (Class A): used more than "X" number of weeks per year

Medium/Medium Demand (Class B): used less than "X" weeks out of year but more than once Slow (Class C): used once during the year (i.e., once every 52 weeks)

Non-Moving (Class D): no usage over 12 months, but currently held in a bin.

Different seasons of a calendar year can affect a spare plug. The spare plug inventory profile can be more accurate by factoring in seasonality. Some telecommunication network has seasonality patterns associated with warm and cold seasons. The seasonality factor is therefore assessed based on the following: warm plug usage rate (total usage units within warm period/today number of days in warm period), annual usage rate (total yearly usage units/days in a year), and seasonal ratio (number of bins whose warm rate exceeds annual rate/total number of bins). If the seasonal ratio is greater than Y % (where Y is an adjustable parameter), the part is considered seasonal. The calculation is generally applied in the region of interest. Seasonality approach may not be used when first profiling a region because usage reporting is poor (not timely and not to the right bins) and current profiling process automatically accommodates seasonality because of the high service levels applied and business rules. The seasonality approach can be used when sufficient historical data of plugs relating to seasonality have been gathered.

Figure 12:
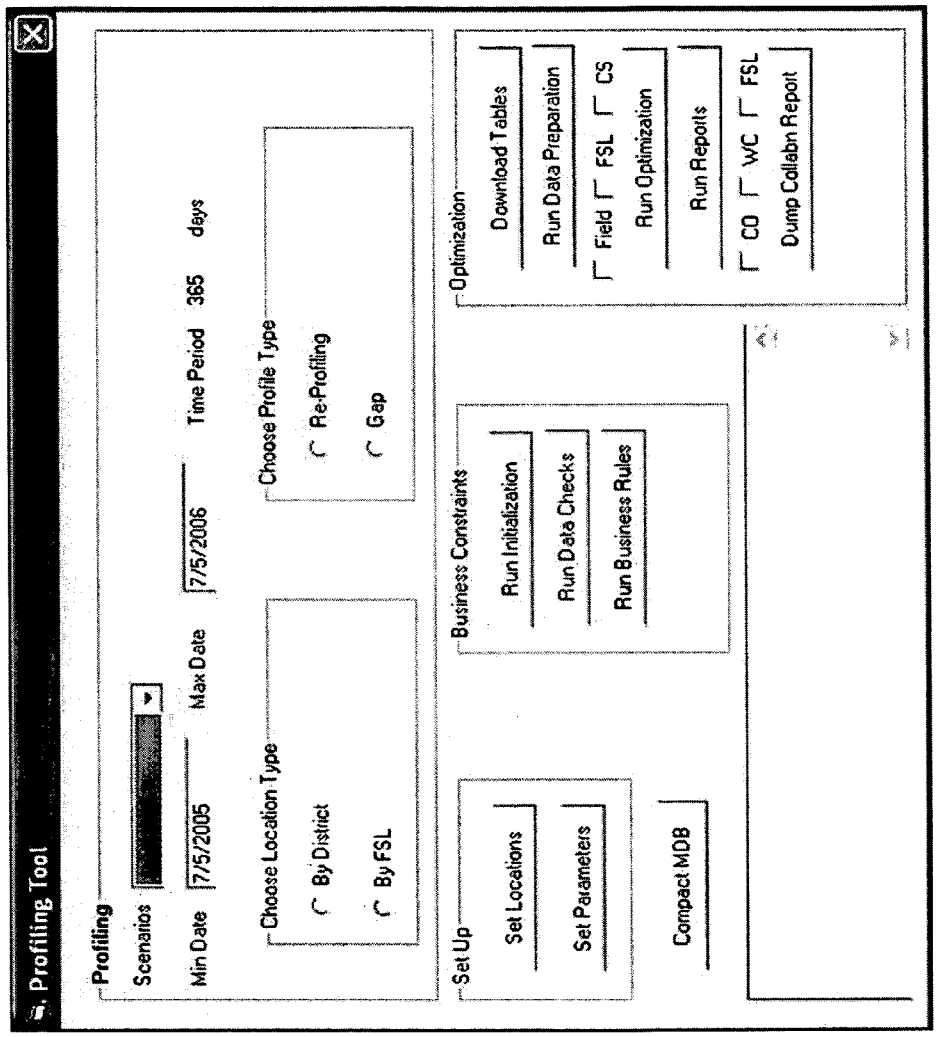
FIG. 12 is an embodiment of a snapshot of a user interface for the inventory modeling tool such as that shown in FIG. 8.

FIG. 12 is one snapshot of a user interface for the tool described in FIG. 8. Such interface allows the user of the inventory modeling system to operate from a single screen the different steps involved in the generation of profiles (after the necessary data has been collected). Additional features (not shown) allow the setting of multiple parameters influencing final inventory levels. For example desired fill rates, inclusion or exclusion of different types of costs, etc. The tool is flexible enough to allow for regular operational use for tactical purposes, and analysis of "what if" scenarios by modifying key input data (e.g., how much would regional inventory increase if demand increased by 10% next year?)

Figure 13:
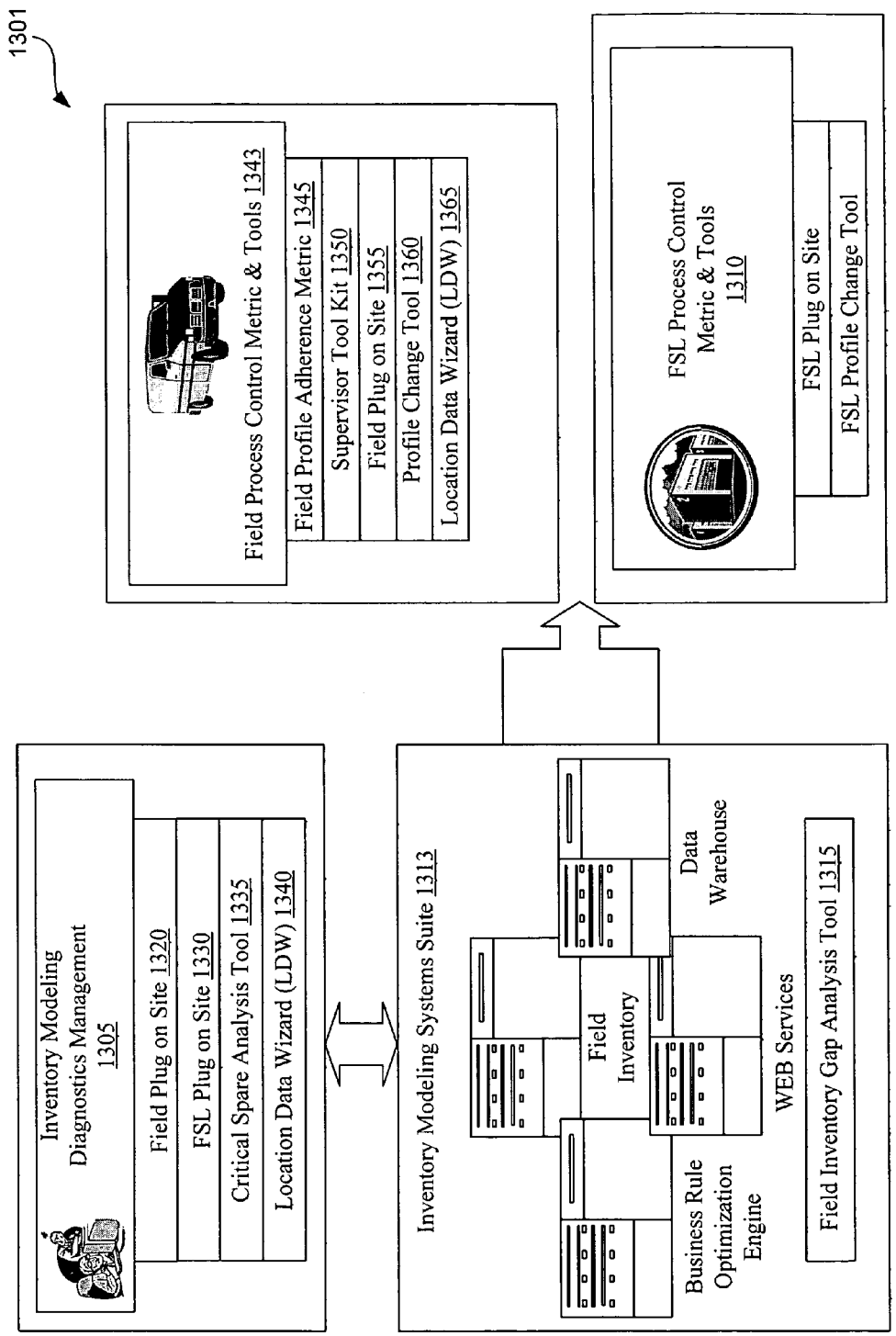
FIG. 13 illustrates a block diagram of an embodiment of a process for the GAP tools, such as that shown in FIG. 7.

FIG. 13 illustrates a block diagram of an embodiment of a process for the GAP tools, such as shown in FIG. 7. Inventory control tools, generally referred to as GAP Tools, ensure that plug modeling system-process for managing spare plugs is sustainable. The GAP Tools includes inventory modeling diagnostics management 1305 and FSL and Field process control metrics & tools 1310, 1343 as functional areas.

The GAP Tool, field inventory gap analysis tool 1315, is integrated into the inventory modeling systems suite 1313. The field inventory gap analysis tool 1315 is used to assess inventory mix approximately every 120 days for CO, WC, and FSL locations and make small incremental recommendations with defined min/max (+/−) level changes. The field inventory gap analysis tool 1315 assesses changes in usage/demand, seasonality and other drivers that may warrant attention between a complete annual profile reviews. The field inventory gap analysis tool 1315 provides information that can be reported to an end user depicting recommended changes on a display device of a computing device via a WEB based Gap Analysis Feedback Tool (not shown). The computing device can either accept all or reject all recommendations. The accept all/reject all process is used since the recommendations have established min/max changes.

The field inventory gap analysis tool 1315 can assess FSL based on the current performance level for critical level 2 plugs on a monthly basis. The FSL stocking performance report can be generated and reviewed on a monthly basis. Based on the availability of critical level 2 plugs within each FSL, the inventory modeling group can determine if gap analysis is required for each FSL on a monthly basis. The FSL administrator can be updated regarding any changes to FSL profiles. The FSL administrator can ensure that excess stock is returned to central stock.

Field plug on site 1320 can be a WEB based tool that is used for measuring field inventory effectiveness or service level. The field plug on site 1320 provides information on how frequently an outside technician or a Central Office (CO) had the plugs they needed. To generate the results, the field plug on site 1320 compares the total plug activations for maintenance spares to the number of times plugs are requested from the FSL or a Customer Service Center. The field plug on site 1320 looks at the requests in a FSL call log including after hour requests that are not sent to the FSL in a Customer Service Center (CSC) Call Log. The field plug on site 1320 can provide the results on a, for example, homepage of a website, with information at a district level and at a detailed level (i.e., specific truck bin or central office), such as for a three-month period. The result includes data of each of the three months being reported.

FSL plug on site 1330 is a WEB based tool that is used for measuring FSL inventory effectiveness or service level. The FSL plug on site 1330 provides information on how frequently an outside technician or a Central Office (CO) and the FSL had the plugs they needed. To generate the results, the FSL plug on site 1330 compares the total number of times the plugs are requested from the FSL and were subsequently shipped from the FSL without a hand-off to another Stocking Location. A source of the data is in the FSL and CSC Call Log. The FSL plug on site 1330 provides results that are shown at a FSL and region level on, for example, a monthly basis. Both plug on sites 1320, 1330 can report results by plug criticality (e.g., 1, 2, or 3).

Critical spare analysis tool 1335 is a WEB based tool that is used to identify potential gaps in establishing Criticality designations for plug-ins. The critical spare analysis tool 1335 assigned any plug-ins that have not been assigned a Criticality level so that the Business Rules and Optimization Engine can establish an inventory model. Other uses for the critical spare analysis tool 1335 is to identify instances where there is a criticality level set yet no authorized spare level has been established for the Stocking Location, FSL, Central Stock, etc.

Location data wizard (LDW) 1340 gathers and provides field information for the Inventory modeling system. This field information includes details for both COs and work centers. For COs, this information includes a listing of all COs and identifies the supervisor's name, CO address, prime CLLI, serving FSL, etc. For work centers, this information includes a complete listing of technicians, supervisor names, bin names, skill sets, address, serving FSL, etc.

This data is maintained in a central repository called the Location Data Wizard (LDW). The LDW is a web based data collection tool for gathering and maintaining the information needed for locations where plug-ins are utilized. During the implementation of the supply chain logistics system, each district was required to complete a location data spreadsheet as a part of implementation. This original spreadsheet has been loaded into the LDW.

As a part of the plug modeling system-process, each district can maintain the data in LDW and ensure that plug modeling system-process is accurate and complete prior to Gap Analysis and Re-profiling being performed for that district. In accordance with the schedule generated, Network Coordinators can ensure LDW has current information for each district. LDW has numerous cross referencing capabilities that allow it to detect data problems on the spot and warn the user. For example LDW will tell the user whenever an inconsistent lead time has been provided for a technician truck, by cross referencing other trucks in the same crew or work center and therefore located the same address.

The plug modeling system-process further includes a field and FSL management control metrics/tools 1343, which also have field plug on site 1355, FSL plug on site, and location data wizard 1365 similar in the inventory modeling diagnostic management 1305. The field and FSL management control tools 1343 further includes a supervisor toolkit 1350, which is a WEB based tool that provides a Key Inventory Statistics Dashboard for the frontline Managers. The supervisor toolkit 1350 summarizes potential areas of improvement in a single report and allows the Manager to drill down to the Technician level. In a single glance, the Manager can quickly determine if their key inventory statistics are within an acceptable norm. These inventory statistics can include; Zero Usage Bins, Excess Inventory Not Processed, and new Shipments Not Receipted in the Field Inventory System within 7 days, etc.

A field profile adherence metric 1345 is a WEB based tool that provides for an overarching measure of how well the Client is adhering to the inventory profiles. In general, Clients are technician supervisors and area managers. The field profile adherence metric 1345 collects all increases and decreases that the Client initiates through Field Gap Analysis, Annual Profile, or Intermediate Profile Changes. These changes update the baseline profile measure and tracks variances to the standard. A Reward and Penalty approach is used in the field profile adherence metric 1345. That is, if the Client "reduces" inventory recommendation, a Reward adjustment to the baseline is established. On the contrary, if the Client "increases" the inventory recommendation, the baseline is negatively impacted.

The baseline is calculated on a monthly and compared to the Actual Inventory that is identified in the Field Inventory Tracking System (not shown). Positive and Negative Variances (Award-Penalty) is provided as a % Over or Under Compliance and presented in a Peer Ranking format.

A profile change tool 1360 is a web-based tool used to report any changes to profiles (i.e., add or delete plugs) in between the formal review process. Because of changes in technology, changes in skill sets, technician movement, usage increases or decreases, etc., a client may have a need to update profiles in between the formal gap analysis and reprofiling activities. If it is necessary to adjust profiles on an informal basis, the client can use the Profile Change Request Tool to document changes. This includes establishing a profile for a new technician (or CO) or making changes to existing Supervisor or Technician, CO Storage, Special or FSL bins.

In addition to scheduling, data collection, and optimization (and validation of data), there are various support activities which take place to maintain the inventory modeling tool. HQ Staff and the Inventory Modeling Group can work together to ensure the supply chain logistics system is maintained. A description of these various support activities and owners are provided in the table below.

| Plug-in Administration Support Activities | |
|---|---|
| Activity | Owner |
| Assign Plug families and Identify Substitutes. As new plugs are added to inventory, determine plug-in compatibility and assign criticality and PLUG FAMILIES. | HQ Staff Inventory Modeling Group |
| Maintain Inventory Management Group (Plug families) and Criticality List. As new Plug families are added or existing Plug families are changed, the plugs are linked to the stock keeping unit (SKU) that a members of a particular family and critical levels are reviewed and updated. Changes to Plug families result in changes being made to the Business Rule Reference Table used in the Inventory modeling system. | HQ Staff Inventory Modeling Group |
| Review and Update Inventory Modeling System. As the needs of the business change, the rules used to generate optimum levels of plug-ins for profiles are reviewed and updated as required. At a minimum, all business rules associated with the Inventory modeling system are reviewed annually. | Inventory Modeling Group HQ Staff |

At any time, a user may review profiles and adjust current profiles. As a result of new technology, changes in skill sets, technician movement, etc. Network may have a need to update profiles in between the formal Gap Analysis and Re-profiling activities. If it is necessary to make adjustments to profiles on an informal basis, Network Field may be required to complete a WEB based Profile Change Request Form.

Figure 14:
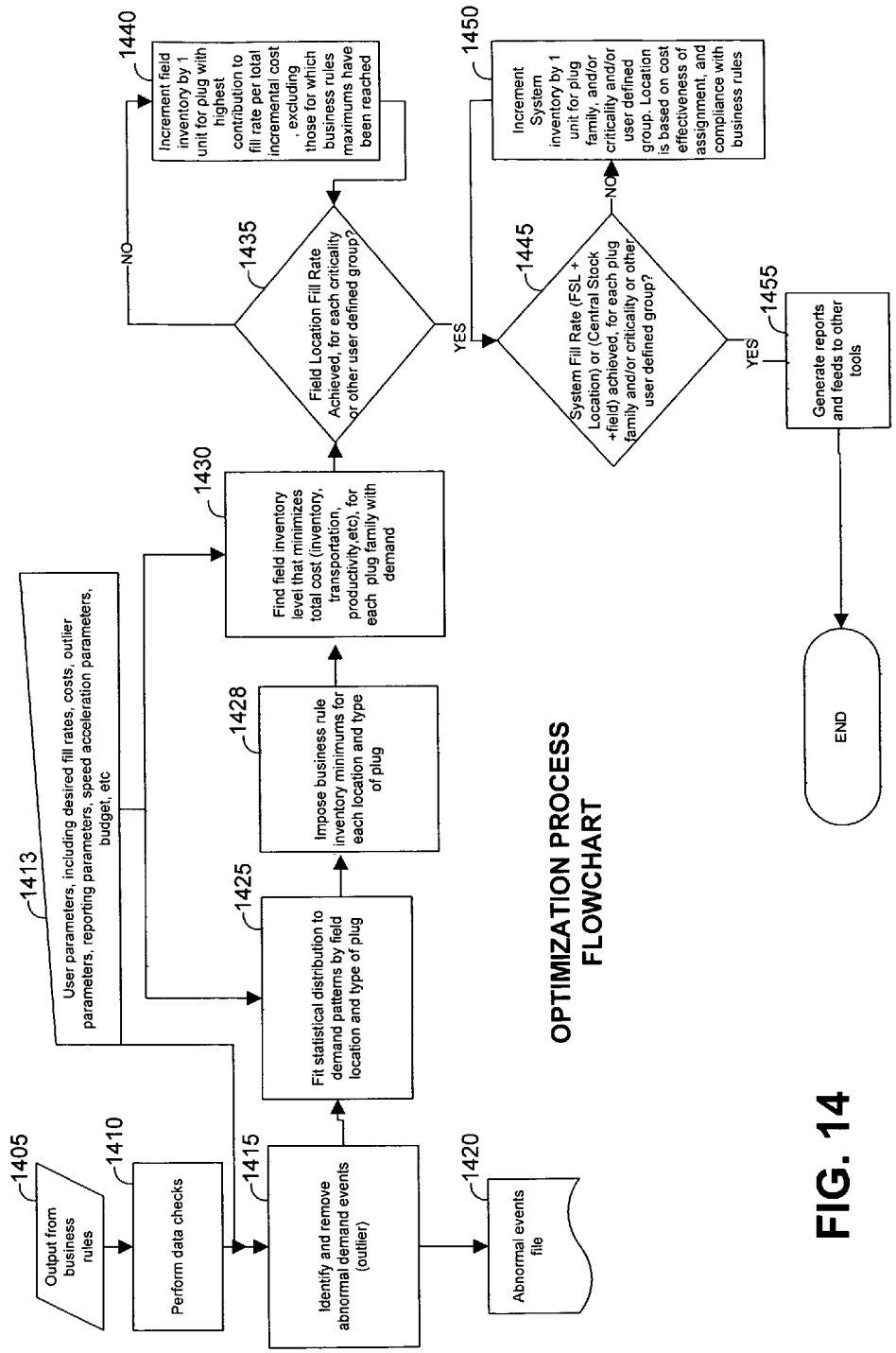
FIG. 14 is a flow diagram of an embodiment of an optimization program, such as that shown in FIG. 8.

FIG. 14 is a flow diagram of an embodiment of an optimization program 813, such as that shown in FIG. 8. Beginning with block 1405, the optimization program receives data from a business rules program 813, such as that shown in FIG. 8. In block 1410, the data is checked for data inconsistencies and lack of completeness. In block 1413, the optimization program obtains user parameters that include, but are not limited to, desired fill rates, costs, outlier parameters, reporting parameters, and speed acceleration parameters, for example. These parameters allow to fine tune the program to current business circumstances. For example fill rates can be made higher or lower based on company goals for satisfying plug demand.

In block 1415, abnormal demand events are identified and removed from the data using an outlier sub-program. Abnormal demand events are non-recurrent demand episodes that are different in size or frequency from what is considered normal and customary. Since this is an automated procedure based on mostly, but not solely, on historical demand patterns, the excluded demand is captured in a special file for review if, for example, the profile ultimately generated does not look as expected. In block 1420, a display device displays the abnormal events file. In block 1425, the optimization program fits statistical distributions to demand patterns by the field location and type of plug. Such distributions may be, for example, Normal or Poisson, or could be distributions that are custom-fitted to historical data.

In block 1428, business rule inventory minimums are applied as starting point for inventory optimization. In block 1430, the optimization program finds field inventory levels that minimize total cost (e.g., inventory, transportation, productivity, etc.) for each plug family with demand. Both the statistical distribution and field inventory level are calculated according to the user parameters obtained in block 1413. It should be note that if the field inventory level calculated in block 1430 based on cost is 1 unit, but a business rule imposes a minimum of 2, then the level assigned to the field inventory level is 2.

In block 1435, the optimization program determines whether the field location fill rate is achieved, for each criticality or other user defined group. If not, the program increments field inventory by 1 unit for the plug with the highest contribution to fill rate per total incremental cost (more specifically the ratio of incremental fill rate to increase in cost), as shown in block 1440, and subject to business rule maximum levels. For example, if inventory level for plug A is increased by a single inventory unit the impact to fill rate (for the plug group optimized) could be 1%, but inventory level for plug B is increased by one unit the fill rate increase could be only 0.5%. Based on fill rate only A should be chosen and not B. However if increasing one unit of B costs only $100 while increasing inventory of A costs $1000 per unit, then B has a better "bang for the buck" and is chosen to be increased instead of A. The fill rate achieved after each increment is calculated to see if the goal fill rate (provided in block 1413 as a parameter) has been achieved.

If the field location fill rate is achieved, the optimization program determines whether the system fill rate is achieved, for each plug family and/or criticality or other user defined group, as shown in block 1445. The system fill rate is the joint fill rate of spare plugs inventory at a field service location and its serving location, where serving location can be central stock or FSL.

If the system fill rate is not achieved, the program increments system inventory by 1 unit for plug family, and/or criticality and/or user defined group, as shown in block 1450. Since for system fill rate an increase in inventory could take place at the serving location or the field location (we are optimizing the joint system), the program makes this location decision of where to increase inventory based on the cost effectiveness of assignment. Business rules constraints are generally followed throughout this process. In block 1455, if the system fill rate is achieved, the optimization is completed and the program generates reports and provide data on the reports to other tools of the supply chain logistics system, such as the data loading programs 709 shown in FIG. 7.

Occasionally the optimization program may be unable to meet all constraints simultaneously, e.g., fill rates and business rules. In such case the program can stop when the marginal benefit being obtained by increasing an additional plug and the ratio of fill rate to cost becomes smaller than a previously specified parameter from block 1413.

The optimization program can also be made to work based on a district budget constraint. The program can repeat the optimization process in FIG. 14, particularly blocks 1430, 1435, 1440, 1445, 1450, and 1455) with progressively increasing fill rates, until it reaches the specified budget. The final fill rates are then calculated instead of being provided as parameters.

The optimization program is able to sacrifice optimality for the benefit of optimization program run time. The resulting profiles obtained are less than mathematically optimal, but usually good enough from a business perspective. The speed acceleration parameters allow the increment of more than one inventory level at once in block 1440.

For extremely low volume plugs the optimization program can derive demand information from working (installed) base and probabilistic failure rates of plugs instead of relying on historical information only.

For the purposes of optimization the program works based on an inventory cost which is a function of the actual cost of acquisition of the plug. The cost used is a weighted average of the cost of purchasing, repair and administrative processing of a returned (good) plug 129. The cost is weighted based on the proportion of the respective plug source observed in the past 12 months.

Figure 15:
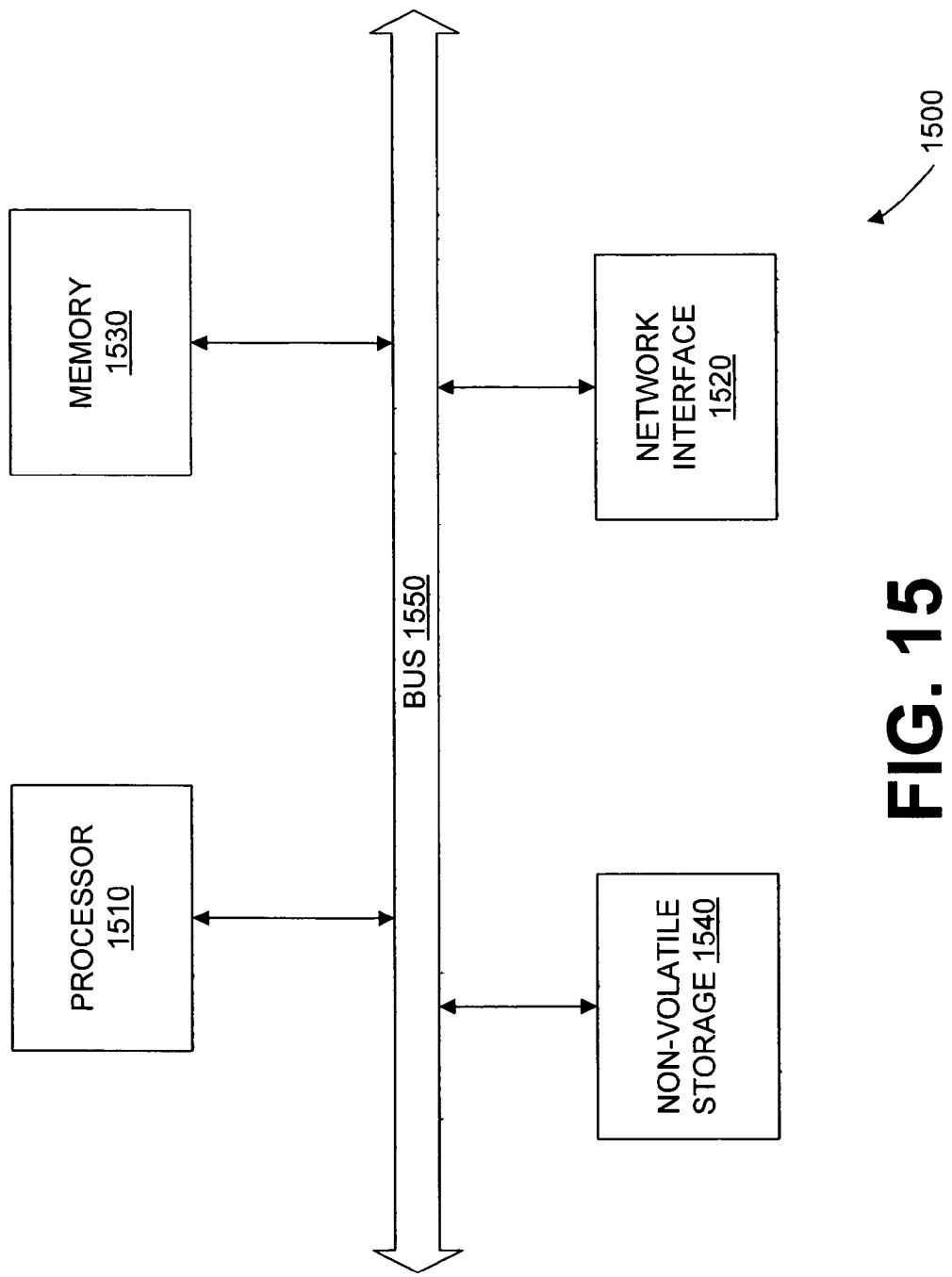
FIG. 15 is a hardware block diagram of a general-purpose computer that can be used to implement one or more of the components of the supply chain logistics system, such as that shown in FIG. 1.

FIG. 15 is a hardware block diagram of a general-purpose computer 1500 that can be used to implement one or more of the components of the supply chain logistics system 100 disclosed herein. The computer 1500 contains a number of components that are generally in the supply chain logistics system, including a processor 1510, a network interface 1520, memory 1530, and non-volatile storage 1540. Examples of non-volatile storage include, for example, a hard disk, flash RAM, flash ROM, EEPROM, etc. These components are coupled via a bus 1550. The memory 1530 contains instructions which, when executed by the processor 1510, implement the methods and systems disclosed herein. Omitted from FIG. 15 are a number of conventional components, known to those skilled in the art that are unnecessary to explain the operation of the system 1500.

The systems and methods disclosed herein can be implemented in software, hardware, or a combination thereof. In some embodiments, the system and/or method is implemented in software that is stored in a memory and that is executed by a suitable microprocessor ($\mu$P) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, or transport the program for use by, or in connection with, the instruction execution system. The computer readable medium can be, for example but not limited to, a system or medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM). In addition, the scope of the certain embodiments of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A method of selecting one or more geographic locations for one or more service facilities of a supply chain logistics system, the method comprising:
   identifying field facilities of a region to be serviced by a plurality of service facilities, wherein servicing the field facilities includes providing parts to the field facilities from the service facilities;
   generating a list of candidate geographic locations for the service facilities;
   applying, with a processor, at least one optimization model to the list of candidate geographic locations and the region to identify which of the candidate geographic locations are to be used for the service facilities; and
   when a first one of the identified geographic locations to be used as one of the service facilities corresponds to a first one of the field facilities, converting the first field facility into a first service facility for the region.

2. A method as defined in claim 1, wherein the at least one optimization model comprises a set covering model to calculate a minimum number of service facilities that can service the field facilities of the region within a delivery time window.

3. A method as defined in claim 2, further comprising constraining the set covering model such that each of the field facilities is served by only one service facility.

4. A method as defined in claim 2, wherein the at least one optimization model includes a minimum uncovered technician model to be implemented when insufficient funds are available to open the minimum number of service facilities calculated by the set covering model.

5. A method as defined in claim 4, wherein the minimum uncovered technician model minimizes a number of technicians outside the delivery time window.

6. A method as defined in claim 1, wherein the at least one optimization model comprises a minimum uncovered technician model that, given a fixed number of service facilities available for the region, is to select the fixed number of service facilities from the candidate geographic locations such that a number of technicians having a reporting location outside a delivery time window is minimized.

7. A method as defined in claim 6, further comprising constraining the minimum uncovered technician model such that each of the field facilities is served by only one service facility.

8. A method as defined in claim 1, wherein the at least one optimization model comprises an uncapacitated facility location model to simultaneously determine a number and locations of service facilities for the region such that logistical costs are minimized subject to a coverage time window constraint.

9. A method as defined in claim 8, further comprising factoring penalty costs for at least one of the service facilities being located outside the coverage time window constraint into the uncapacitated facility location model.

10. A method as defined in claim 1, further comprising determining whether the first field facility meets operational constraints and, if the first field facility does not meet the operational constraints, prohibiting the conversion of the first field facility into the first service facility.

11. A tangible machine readable medium having instructions stored thereon that, when executed, cause a machine to at least:
    identify field facilities of a region to be serviced by a plurality of service facilities, wherein servicing the field facilities comprises providing parts to the field facilities;
    generate a list of candidate geographic locations for the service facilities;
    apply at least one optimization model to the list of candidate geographic locations and the region to identify which of the candidate geographic locations are to be used for the service facilities; and
    when a first one of the identified geographic locations to be used as one of the service facilities corresponds to a first one of the field facilities, convert the first field facility locations into a first service facility for the region.

12. A tangible machine readable medium as defined in claim 11, wherein the at least one optimization model comprises a set covering model to calculate a reduced number of service facilities that can service the field facilities of the region within a delivery time window.

13. A tangible machine readable medium as defined in claim 12, wherein the instructions, when executed, cause the machine to constrain the set covering model such that each of the field facilities is served by only one service facility.

14. A tangible machine readable medium as defined in claim 12, wherein the at least one optimization model includes a reduced uncovered technician model to be implemented when insufficient funds are available to open a reduced number of service facilities calculated by the set covering model.

15. A tangible machine readable medium as defined in claim 14, wherein the uncovered technician model reduces a number of technicians outside the delivery time window.

16. A tangible machine readable medium as defined in claim 11, wherein the at least one optimization model comprises a reduced uncovered technician model that, given a fixed number of service facilities available for the region, is to select the fixed number of service facilities from the candidate geographic locations such that a number of technicians having a reporting location outside a delivery time window is reduced.

17. A tangible machine readable medium as defined in claim 16, wherein the instructions, when executed, cause the machine to constrain the reduced uncovered technician model such that each of the field facilities is served by only one service facility.

18. A tangible machine readable medium as defined in claim 11, wherein the at least one optimization model comprises an uncapacitated facility location model to simultaneously determine a number and locations of service facilities for the region such that logistical costs are reduced subject to a coverage time window constraint.

19. A tangible machine readable medium as defined in claim 18, wherein the instructions, when executed, cause the machine to factor penalty costs for at least one of the service facilities being located outside the coverage time window constraint into the uncapacitated facility location model.

20. A tangible machine readable medium as defined in claim 11, wherein the instructions cause the machine to determine whether the first field facility meets operational constraints and, if the first field facility does not meet the operational constraints, prohibit the conversion of the first field facility into the first service facility.

* * * * *